United States Patent [19]
Narihiro

[11] Patent Number: 5,537,539
[45] Date of Patent: Jul. 16, 1996

[54] METHOD AND APPARATUS FOR CONTROLLING A COMPUTER SYSTEM

[75] Inventor: Koji Narihiro, Yokohama, Japan

[73] Assignee: Fujitsu Limited, Kawasaki, Japan

[21] Appl. No.: 301,783

[22] Filed: Sep. 7, 1994

[30] Foreign Application Priority Data

Sep. 7, 1993 [JP] Japan .................................. 5-222561

[51] Int. Cl.$^6$ .................................................. G06F 11/00
[52] U.S. Cl. ............................... 395/183.14; 395/184.01; 364/243.3; 364/245.3; 364/267; 364/267.4; 364/274.1
[58] Field of Search .................................. 395/575, 325, 395/600, 183.14, 183.22, 184.01, 185.01, 185.02; 364/285, 243.3, 245.3, 267, 267.4, 274.1, 943.9

[56] References Cited

U.S. PATENT DOCUMENTS

| | | | |
|---|---|---|---|
| 4,849,877 | 7/1989 | Bishop et al. | 364/230.3 |
| 4,855,936 | 8/1989 | Casey et al. | 364/521 |
| 4,888,681 | 12/1989 | Barnes et al. | 364/200 |
| 5,062,040 | 10/1991 | Bishop et al. | 364/230 |
| 5,077,658 | 12/1991 | Bendert et al. | 395/600 |
| 5,237,682 | 8/1993 | Bendert et al. | 395/600 |
| 5,333,315 | 7/1994 | Saether et al. | 395/600 |
| 5,363,487 | 11/1994 | Willman et al. | 395/275 |

*Primary Examiner*—Robert W. Beausoliel, Jr.
*Assistant Examiner*—Dieu-Minh Le
*Attorney, Agent, or Firm*—Staas & Halsey

[57] ABSTRACT

A method and apparatus for controlling a computer system having an operating system program, that constitutes a given operating system and that carries out control of operations of the computer system as a whole and also having one or a plurality of application programs that are executable by the operating system and which are separate from the operating system program. When the operating system detects a fault occurring in a certain application program, management information concerning the faulty application program is transferred to a space in a dedicated application program for processing any fault; the program space of the faulty application program is stored into the space in the dedicated application program; necessary information regarding the faulty application program is collected by means of the dedicated application program; and a substitute process for the request for the faulty application program is executed in accordance with a predetermined procedure, by means of the dedicated application program.

6 Claims, 18 Drawing Sheets

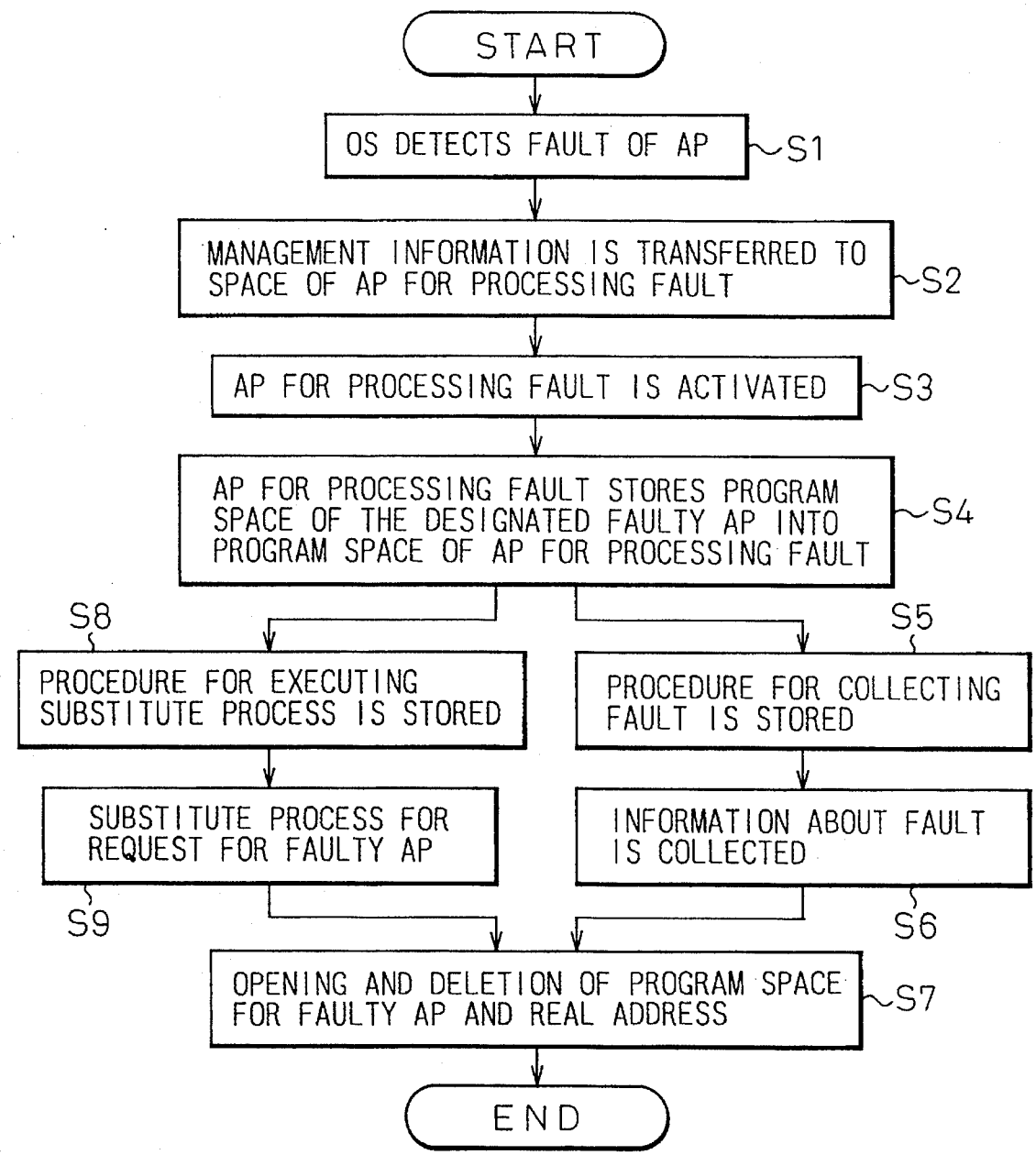

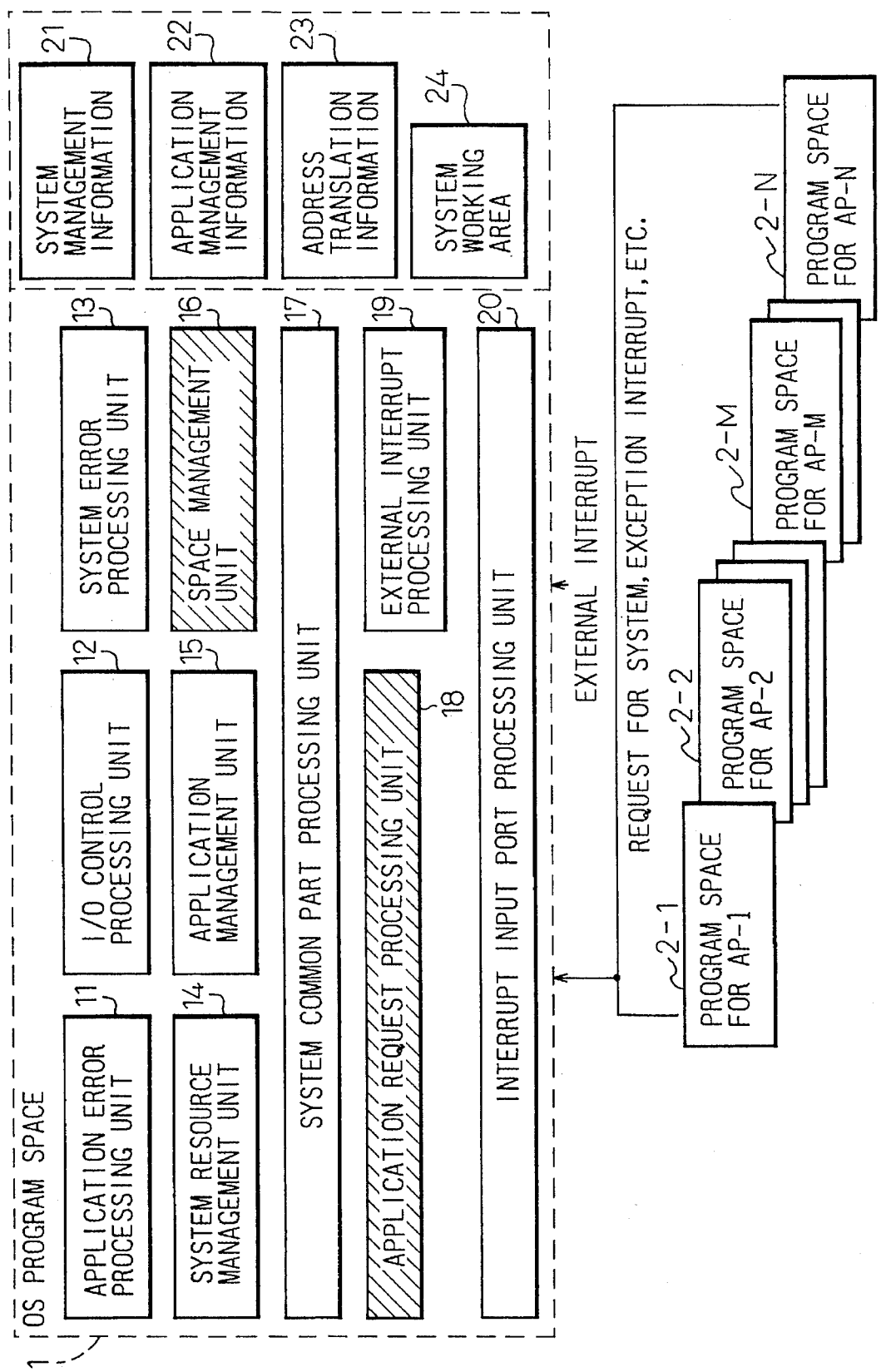

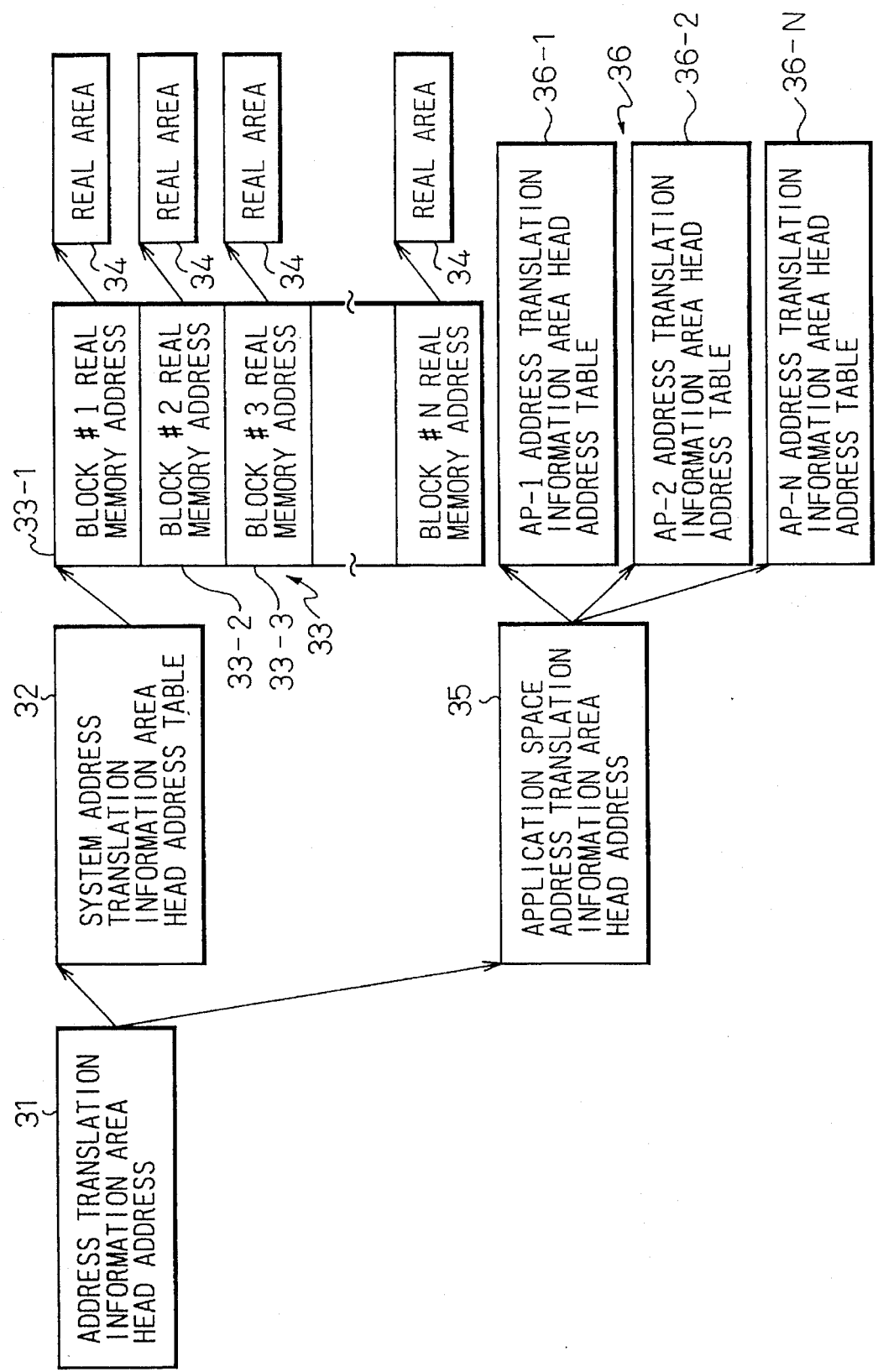

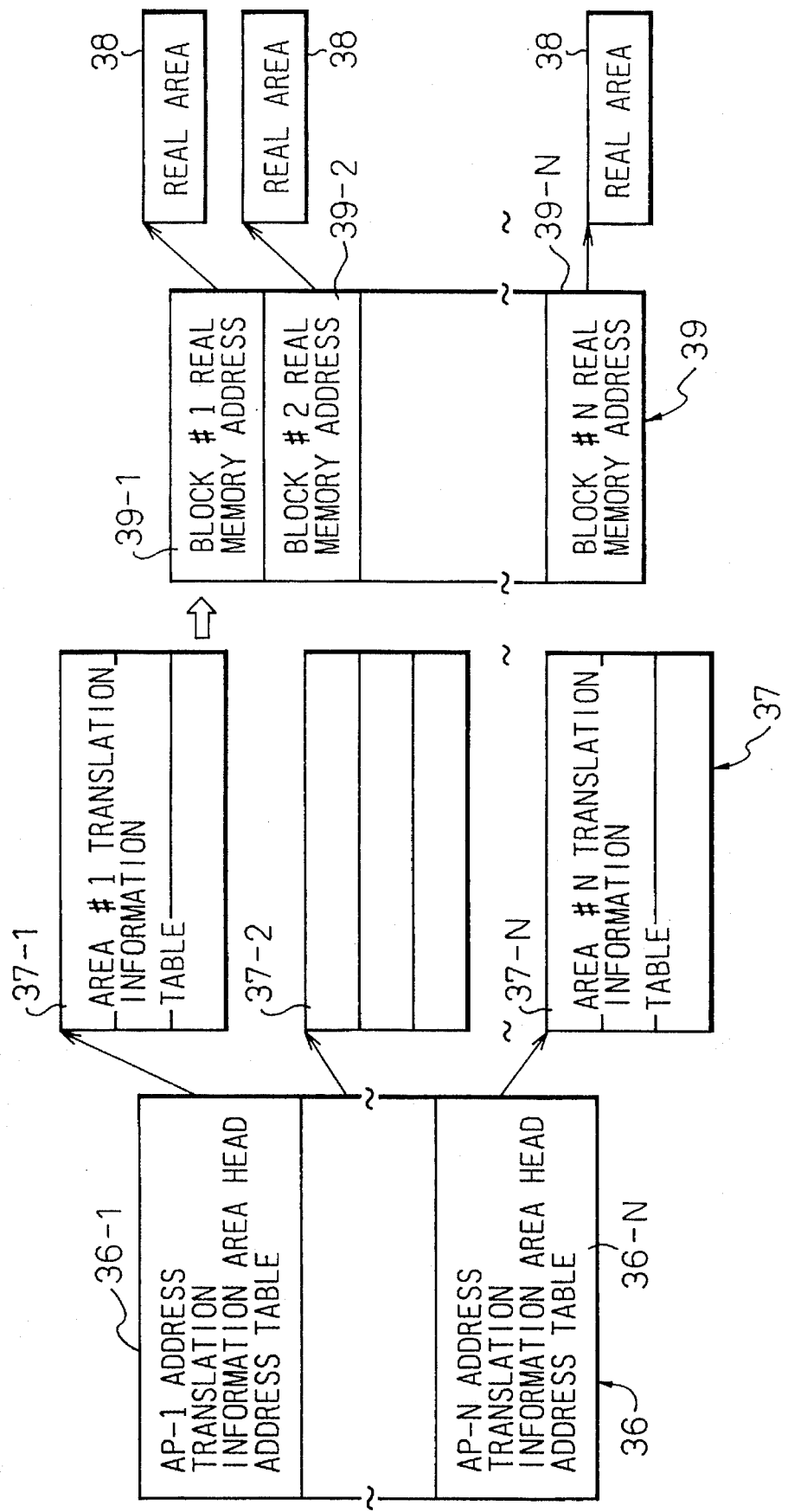

METHOD AND APPARATUS FOR CONTROLLING A COMPUTER SYSTEM

BACKGROUND OF THE INVENTION

1. Field of the Invention

The present invention relates to a method and apparatus for controlling a computer system in the case where a fault occurs in an application program. Typically, a computer system includes an operating system program which constitutes a given operating system and which is adapted to carry out the control of the operations of the computer system as a whole. Further, the computer system also includes one or a plurality of application programs which are executable by such an operating system, and which are provided separate from the operating system program.

Especially, the present invention relates to a technique for handling a fault or failure regarding application programs without lowering the operational efficiency of the computer system, even though the fault or failure occurs in a certain application program arranged in an address space different from that of any other application program.

2. Description of the Related Art

In recent years, most computer systems have system configurations in which an operating system (sometimes abbreviated to "OS"), for managing and controlling operations of the computer system as a whole, is provided, perfectly distinct (i.e., completely separate) from application programs executable by such an operating system. In such a configuration, an address space for the operating system and the address space for each of the application programs are arranged, definitely (i.e., clearly and distinctly) separate from each other. Further, a program space of the operating system and a program space for each of the application programs are also arranged, definitely separate from each other.

In such systems case, an executable operation mode carried out by the OS is usually referred to as a system mode, while an executable operation mode carried out by an application program is usually referred to as a user mode. Further, the program space of the OS is referred to as a system space or a system area.

In the above-mentioned computer system, an abnormality sometimes occurs in a certain application program, e.g., a fault due to a runaway of the application program, an illegal access operation by the faulty application program, or the like. Such a fault is usually detected through an exception interrupt issued by the application program in which an abnormality occurs, a validity check of various data and programs by the OS, or the like.

In such a technique, when the above-mentioned abnormality has been detected by the OS, a process for terminating the execution of program due to the fault is carried out for the faulty application program (hereinafter, the application program in which an abnormality occurs will be referred to as "the faulty application program").

At this time, in order to determine the cause of the above-mentioned abnormality, e.g., a fault in the faulty application program (i.e., the failing application program), some information necessary for analyzing faults is usually collected and transferred to a given file, or the like. Such information generally includes fault information obtained from a memory dump in a memory area of the program space of the faulty application program, and management information, for controlling application programs, which is provided in the system space.

In this case, it should be noted that the program space for each application program is separated from any other program space. In such a configuration of program space, access to the above-mentioned information regarding a fault of the faulty application program can be carried out only by using the system mode of an OS.

Namely, it is difficult to obtain the above-mentioned information regarding a fault, of the faulty application program, by using the other, normal application programs provided independently of the faulty application program. Further, the management information, etc., which an OS maintains in its system space, may be changed due to other operations of the computer system.

Therefore, in the prior art, the OS per se is designed to collect some information necessary for analyzing faults, in the case where a certain application program fails, so that the fault or failure of the application program can be accurately detected and analyzed.

As mentioned above, in the case where the OS per se collects the information regarding a fault or failure of the faulty application program, a process for collecting the information regarding a fault and storing the information into a given file is executed, in the system mode, by the OS, prior to any other process. Namely, the process for collecting and saving the information regarding a fault or failure of the faulty application program has priority over any other process of the remaining application programs, regardless of the priority that the faulty application program has before the fault occurs.

In such a configuration, even though some of the remaining application programs may have a higher priority than the faulty application program, the execution of the remaining application programs is delayed. Consequently, a problem occurs in that an operational efficiency of a computer system may deteriorate.

Recently, higher performance has been required for computer systems, and simultaneously the size of application programs has also increased. Therefore, the program space, which is allocated to application programs, tends to remarkably increase. Further, the amount of the information regarding a fault, which must be collected when the fault occurs in a certain application program, tends to be remarkably increased.

When there is a remarkable increase in the program space and the amount of the information regarding a fault, as described above, the time required by the OS to collect the information regarding the fault and to save such information by using an OS is also increased. With the increase of such time, the time utilized for allocating various instructions from a central processing unit (CPU) to a plurality of normal application programs is likely to gradually decrease.

Consequently, the performance of the whole computer system may fall. In other words, an increase in the time necessary for an OS to collect and save the information regarding a fault may have a serious influence, or impact, on the performance of the whole computer system.

Further, according to a technique for handling a fault in the prior art, the information regarding a fault is collected in the system mode, by the OS. Namely, a process for collecting the information regarding a fault is executed for every application program to the same degree. Therefore, extra information, other than the information necessary for individually analyzing each application program, is likely to be collected. On the other hand, important information, actually necessary for analyzing the faulty application program, may be omitted, owing to the large amount of information which is to be collected.

Further, a situation sometimes occurs in which it becomes necessary for the faulty application program to continue executing some subsequent process, even after a process for terminating the execution of program due to the fault or failure has been carried out for the faulty application program. In this case, the request for the execution of the above-mentioned subsequent process is made to the faulty application program during the time period, from the time when the faulty application program is activated again and an initialization of the program is completed, until the time when the application program again becomes executable.

Even though such a situation occurs, it is not possible for an OS to meet this requirement. Consequently, another problem occurs in that the contents of the request for the execution of the above-mentioned subsequent process are treated as an abnormality, or disregarded.

SUMMARY OF THE INVENTION

In view of the the above-mentioned problems, the main object of the present invention is to provide a method and apparatus for controlling a computer system in the case where a fault occurs in an application program, in which the fault can be handled without reducing the operational efficiency of the computer system.

A further object of the present invention is to provide a method and apparatus for controlling a computer system, in which collection of extra information, other than necessary information, by means of an operating system can be avoided, and only necessary information can be assuredly collected.

A still further object of the present invention is to provide a method and apparatus for controlling a computer system, which allows for meeting a request for some subsequent process that is made to the faulty application program, even after a process for terminating the execution of application program due to the fault has been carried out.

To attain the above objects, the method and apparatus according to the present invention are directed to controlling a computer system having an operating system program that constitutes a given operating system and that carries out the control for the operations of the computer system as a whole, and also having one or a plurality of application programs that are executable by the operating system, and that are provided separate and apart from the operating system program, in the case where a fault occurs in a certain application program among the plurality of application programs, each of which has an address space different from that of any other application program.

In this case, a collection-procedure file which stores a procedure for collecting fault information about the fault is provided for every application program as well as an information file for storing information, including the fault information, said information indicating the type of the information per se that is to be collected when a fault occurs and also indicating a procedure for collecting the information per se that is to be be collected when a fault occurs.

Further, in this case, a substitute-procedure file is also provided, for every application program, which designates a procedure for executing a substitute process by means of a dedicated application program for processing any fault.

More specifically, the dedicated application program for processing any fault, which is defined as one of the application programs, is provided in a program space of the application programs. Such a dedicated application program has a space for storing management information about the management of the operating system, a space for storing the program space of a faulty application program in which a fault occurs, a space for storing the procedure for collecting the fault information, and a space for storing the procedure for executing the substitute process, the dedicated application program executing a given control process for any one of the other application programs when the fault occurs in any one of the other application programs.

Further, in this case, the operating system has a function for excepting any one of the other application programs from the subject of the management by the operating system to control execution of the application programs, and further transferring the program space of any one of the other application programs to the program space of the dedicated application program having space for storing the procedure for collecting the fault information, and further carrying out an opening and deletion of the program space of any one of the other application programs.

In the above-mentioned configuration of the computer system, a first method for controlling the computer system according to the present invention includes a step of detecting a fault (or failure) of a certain application program corresponding to the faulty application program, by means of the operating system; a step of transferring the management information, including an application management information of the faulty application program, to the space for storing the management information of the dedicated application program for processing any fault, by means of the operating system; a step of notifying the dedicated application program for processing any fault of the faulty application program, and activating the dedicated application program for processing any fault, by means of the operating system; a step of storing the program space of the faulty application program, which is designated by the operating system, into the space for storing the program space of the faulty application program in the dedicated application program for processing any fault, by means of the dedicated application program for processing any fault; a step of selecting the procedure for collecting the fault information from the collection-procedure file, and storing the procedure for collecting the fault information into the space for storing the procedure for collecting the fault information, by means of the dedicated application program for processing any fault; a step of collecting a necessary information which is designated in accordance with the thus stored procedure for collecting the fault information, and storing the thus collected information into the information file, by means of the dedicated application program for processing any fault; and a step of carrying out an opening and deletion of the program space of the faulty application program, which has been stored into the space for storing the program space of the faulty application program in the dedicated application program for processing any fault, when the transfer of the management information is completed, by means of the operating system.

In a similar configuration of the computer system, a second method for controlling a computer system according to the present invention includes a step of detecting a fault of a certain application program corresponding to the faulty application program, by means of the operating system; a step of transferring the management information, including application management information of the faulty application program, to the space for storing the management information of the dedicated application program for processing any fault, by means of the operating system; a step of notifying the dedicated application program for processing any fault of the faulty application program, and activating the dedicated application program for processing any fault, by means of the operating system; a step of storing the program space of the faulty application program, which is designated by the operating system, into the space for storing the program space of the faulty application program in the dedicated application program for processing any fault, by means of the dedicated application program for processing any fault; a step of reading out the procedure for executing the substitute process from the substitute-procedure file, and storing the procedure for executing the substitute process into the space for storing the procedure for executing the substitute process, by means of the dedicated application program for processing any fault; a step of executing the substitute process for the request for the faulty application program in accordance with the thus stored procedure for executing the substitute process, by means of the dedicated application program for processing any fault; and a step of carrying out an opening and deletion of the program space of the faulty application program, which has been stored into the space for storing the program space of the faulty application program in the dedicated application program for processing any fault, when a transfer of the management information is completed, by means of the operating system.

In a similar configuration of the computer system, a third method for controlling the computer system according to the present invention includes a combination of the steps in the above-mentioned first method and the steps in the above-mentioned second method.

Preferably, in each method for controlling the computer system, the program space of the operating system program and the program space of the application programs are divided into a plurality of memory blocks, and a real memory is allocated to every memory block.

Further, preferably, an apparatus for carrying out the first method for controlling the computer system according to the present invention has a means for detecting a fault (or failure) of a certain application program corresponding to the faulty application program; a means for transferring the management information to the space for storing the management information of the dedicated application program for processing any fault; a means for notifying the dedicated application program for processing any fault of the faulty application program, and activating the dedicated application program for processing any fault; a means for storing the program space of the faulty application program into the space for storing the program space of the faulty application program in the dedicated application program for processing any fault; a means for selecting the procedure for collecting the fault information from the collection-procedure file, and storing the procedure for collecting the fault information into the space for storing the procedure for collecting the fault information; a means for collecting a necessary information which is designated in accordance with the thus stored procedure for collecting the fault information, and storing the thus collected information into the information file; and a means for carrying out an opening and deletion of the program space of the faulty application program, which has been stored into the space for storing the program space of the faulty application program in the dedicated application program for processing any fault, in the case where it is confirmed that a transfer of the management information is completed.

Further, preferably, an apparatus for carrying out the second method for controlling the computer system according to the present invention has a means for detecting a fault of a certain application program corresponding to the faulty application program; a means for transferring the management information to the space for storing the management information of the dedicated application program for processing any fault; a means for notifying the dedicated application program for processing any fault of the faulty application program, and activating the dedicated application program for processing any fault; a means for storing the program space of the faulty application program into the space for storing the program space of the faulty application program in the dedicated application program for processing any fault; a means for reading out the procedure for executing the substitute process from the substitute-procedure file, and storing the procedure for executing the substitute process into the space for storing the procedure for executing the substitute process; a means for executing the substitute process for the request for the faulty application program in accordance with the thus stored procedure for executing the substitute process; and a means for carrying out an opening and deletion of the program space of the faulty application program, which has been stored into the space for storing the program space of the faulty application program in the dedicated application program for processing any fault, when it is confirmed that a transfer of the management information is completed.

Further, preferably, an apparatus for carrying out the third method for controlling the computer system according to the present invention has means provided by the apparatus for carrying out the first method and also means provided by the apparatus for carrying out the second method.

According to the first method and apparatus for carrying out the first method, when the operating system detects a fault of a faulty application program, the fault information regarding a fault of the faulty application program is adapted to be collected by the dedicated application program for processing any fault, not by the operating system program. Therefore, it becomes possible for the operating system program to carry out a process of any other application program having higher order of priority than the faulty application program. Consequently, the operational efficiency of the whole computer system is not reduced.

Further, in this method and apparatus, a process for collecting the fault information is not executed for every application program to the same degree, unlike the prior art utilizing the system mode. On the contrary, the fault information is collected in a user mode, by utilizing the dedicated application program for processing any fault. Namely, a process for collecting the fault information is executed on the basis of a procedure and contents appropriate for each of the application programs. Therefore, it becomes possible for important fault information necessary for analyzing the faulty application program to be effectively utilized.

According to the second method and apparatus for carrying out the second method, when the operating system detects a fault of a faulty application program, the dedicated application program for processing any fault is adapted to carry out a substitute process for the request for the faulty application program. Therefore, when the request for the faulty application program is made to the faulty application program, the contents of the request are not treated as an abnormality and are not disregarded. Namely, it becomes possible for the request for the faulty application program to be appropriately processed as a normal request.

According to the third method and apparatus for carrying out the third method, the dedicated application program for processing any fault is adapted to carry out a process for collecting fault information and a substitute process for the request for the faulty application program. Therefore, a utilization efficiency of the computer system as a whole can be improved.

Further, in this method and apparatus, it becomes possible for the operating system program to continue carrying out a process of any other application program having higher priority than the faulty application program. Therefore, the operational efficiency of a computer system is not reduced.

BRIEF DESCRIPTION OF THE DRAWINGS

The above object and features of the present invention will be more apparent from the following description of the preferred embodiments with reference to the accompanying drawings, wherein:

FIG. 1 is a flowchart for explaining an essential embodiment based on the principle of a method for controlling a computer system according to the present invention;

FIG. 3 is a block diagram showing a program space in a computer system to which a preferred embodiment of the present invention is applied;

FIG. 4 is a block diagram showing a state of a space-address translation information in a computer system to which a technique of the present invention is applied;

FIG. 5 is a block diagram showing a state of a space-address translation information in an application program of a computer system to which a technique of the present invention is applied;

DESCRIPTION OF THE PREFERRED EMBODIMENTS

Figure 2A:
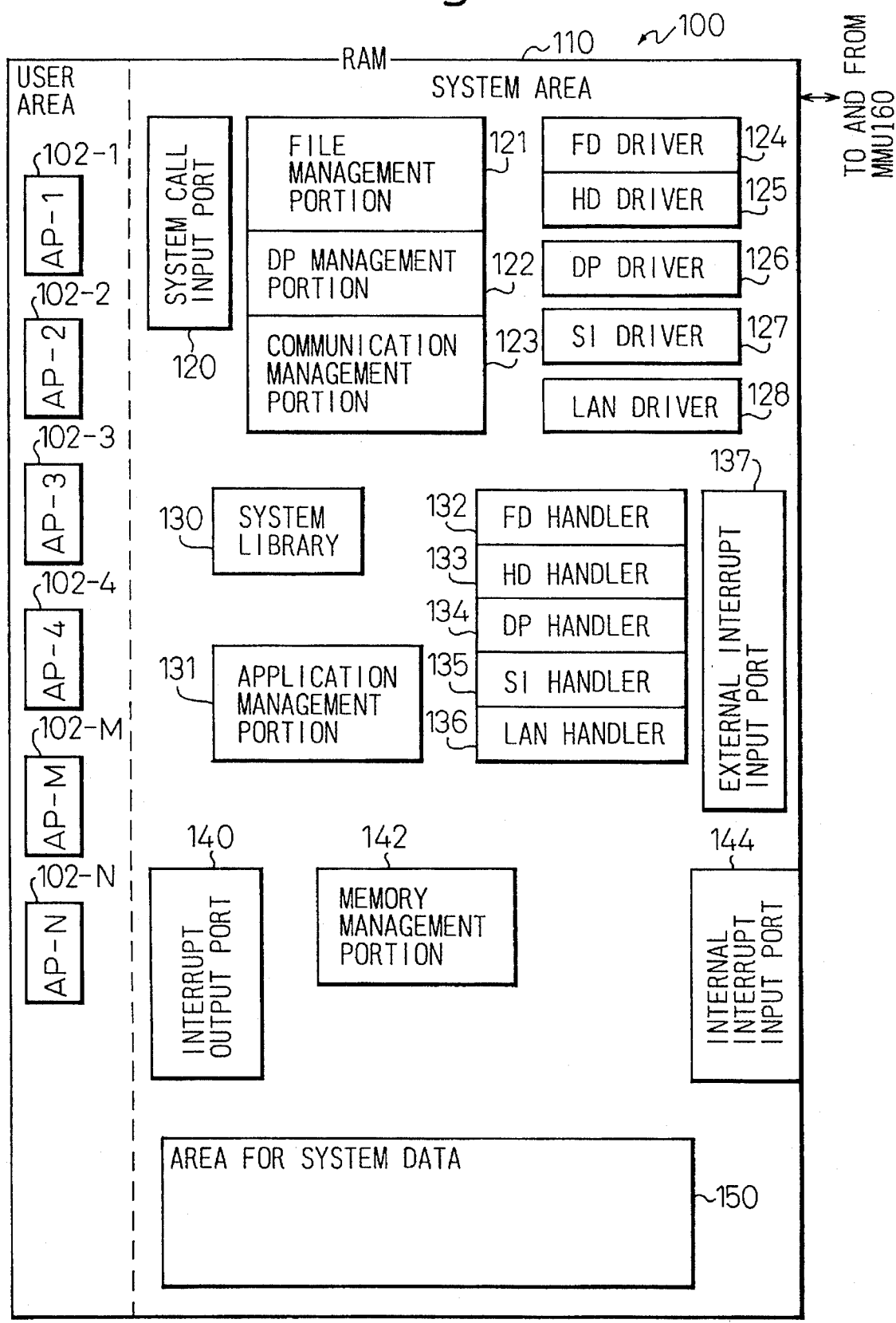
FIG. 2A is a block diagram showing a part of a basic configuration corresponding to an apparatus for controlling a computer system according to the present invention.

Hereinafter, a detailed description regarding preferred embodiments of the present invention will be given with reference to FIGS. 1 to 17.

FIG. 1 is a flowchart for explaining an essential embodiment based on the principle of a method for controlling a computer system according to the present invention. In this case, a flowchart corresponding to the third method of the present invention is representatively illustrated.

Further, a computer system, to which the third method of the present invention is applied, has an operating system program that constitutes a given operating system and that carries out the control for operations of the computer system as a whole, and also has one or a plurality of application programs that are executable on the operating system, and that are provided separate from the operating system program.

Here, it is assumed that a fault or failure occurs in a certain application program among the plurality of application programs, each of which has an address space different from that of any other application program.

Further, the flowchart in FIG. 1 is executed under the condition that a collection-procedure file, which stores a procedure for collecting a fault information about the fault, is provided for every application program, as well as an information file for storing information including the fault information.

Further, the flowchart in FIG. 1 is also executed under the condition that a substitute-procedure file is also provided for every application program, which designates a procedure for executing a substitute process by means of a dedicated application program for processing any fault.

The dedicated application program for processing any fault is defined as one of the application programs, and provided in the program space of the application programs. Such a dedicated application program has a space for storing management information about the management of the operating system, a space for storing the program space of a faulty application program, a space for storing the procedure for collecting the fault information, and a space for storing the procedure for executing the substitute process.

Further, the flowchart in FIG. 1 is also executed under the condition that the operating system has a function of excepting any one of the other application programs from the object of the management of the operating system to control execution of the application programs, and further transferring the program space of any one of the other application programs to the program space of the dedicated application program, and further carrying out an opening and deletion of the program space of any one of the other application programs.

Under these conditions, in a step S1 of FIG. 1, a fault of a certain application program (hereinafter, "application program" sometimes abbreviated to "AP") corresponding to the faulty application program is detected by means of an OS.

In a step S2, the management information, including an application management information of the faulty application program, is transferred to the space for storing the management information of the dedicated application program for processing any fault, by means of the OS.

In a step S3, the dedicated application program for processing any fault is notified of the faulty application program and activated, by means of the OS.

In a step S4, the dedicated application program stores the program space of the faulty application program, which is designated by the operating system, into the space for storing the program space of the faulty application program in the dedicated application program.

In a step S5, the dedicated application program selects and takes out the procedure for collecting the fault information from the collection-procedure file, and stores the procedure for collecting the fault information into the space for storing the procedure for collecting the fault information.

In a step S6, the dedicated application program collects a necessary information which is designated in accordance with the thus stored procedure for collecting the fault information, and stores the thus collected information into the information file.

In a step S8, the dedicated application program retrieves and reads out the procedure for executing the substitute process from the substitute-procedure file, and stores the procedure for executing the substitute process into the space for storing the procedure for executing the substitute process.

In a step S9, the dedicated application program executes the substitute process for the request for the faulty application program in accordance with the thus stored procedure for executing the substitute process.

In a step S7, an opening and deletion of the program space and a real memory address for the faulty application program, which has been stored into the space for storing the program space of the faulty application program in the dedicated application program, is carried out, when a transfer of the management information is completed, by means of the operating system.

In a technique of the present invention shown in FIG. 1, the dedicated application program for processing any fault carries out a process for collecting the fault information and the substitute process for the request for the faulty application program, in place of the OS. Therefore, the utilization efficiency of the computer system, including the execution of operating system program and application programs, can be improved as a whole.

Further, it becomes possible for the operating system program to carry out a process of any other application program having higher order of priority than the faulty application program. Therefore, a deterioration of the operational efficiency of a computer system can be avoided.

Figure 2B:
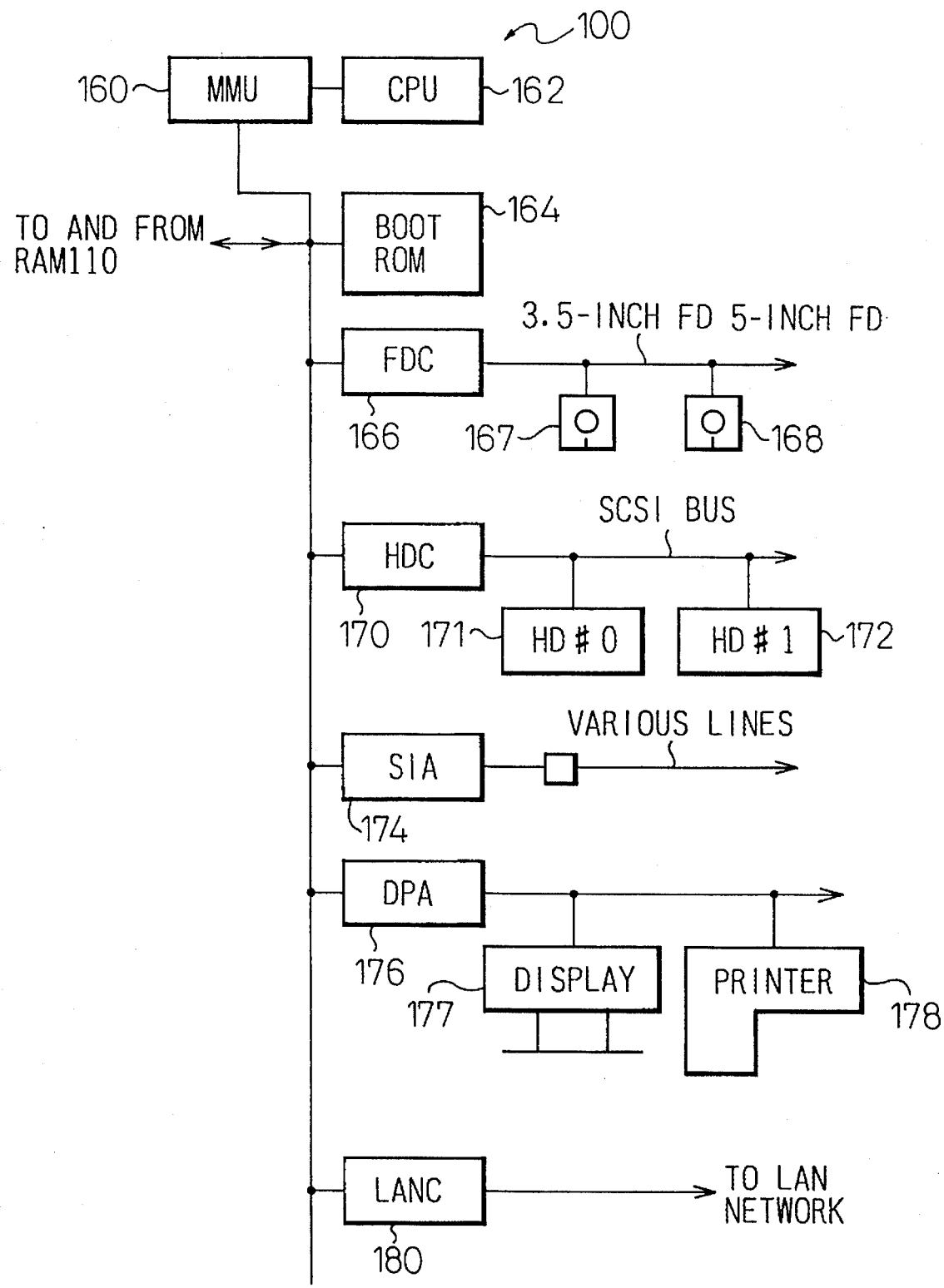
FIG. 2B is a block diagram showing the remaining part of a basic configuration corresponding to an apparatus for controlling a computer system according to the present invention.

FIG. 2A is a block diagram showing a part of a basic configuration corresponding to an apparatus for controlling a computer system according to the present invention; and FIG. 2B is a block diagram showing the remaining part of a basic configuration corresponding to the above-mentioned apparatus.

In a preferred embodiment shown in FIGS. 2A and 2B, the apparatus for controlling a computer system according to the present invention is constituted in a computer system 100. The computer system 100 includes a RAM (Random Access Memory) 110 (FIG. 2A) for allocating a plurality of memory blocks to an operating system program and application programs; an MMU (Memory Management Unit) 160 (FIG. 2B) which manages an access operation of the RAM 110 and has a function of address translation, etc.; a boot ROM (Read Only Memory) 164 which stores an address information of each memory block in the RAM 110; a CPU (Central Processing Unit) 162 which controls various programs such as the operating system program and application programs and the related data of the whole computer system; and peripheral equipment connected to the RAM 110, the MMU 160, the CPU 162, and the like.

Further, in FIG. 2B, the peripheral equipment is mainly constituted by a floppy disk controller (abbreviated to "FDC" in FIG. 2B) 166 which controls floppy disks such as 3.5-inch FD 167 and 5-inch FD 168; a hard disk controller (abbreviated to "HDC" in FIG. 2B) 170 which controls hard disks (abbreviated to "HD#0 and HD#2" in FIG. 2B) 171, 172 via an SCSI (Small Computer System Interface) bus; a serial interface adapter (abbreviated to "SIA" in FIG. 2B) 174 which controls various lines; and a display /printer adapter (abbreviated to "DPA" in FIG. 2B) 176 which controls a display 177 and a printer 178; and a local area network controller (abbreviated to "LANC" in FIG. 2B) 180 which controls a local area network (LAN network).

Returning to FIG. 2A, the RAM 110 consists of two kinds of memory areas. One memory area is defined as a system area or a system space in which an operating system program and necessary data for executing the operating system program are stored. The remaining memory area is defined as a user area in which a plurality of application programs (AP-1 to AP-N corresponding to application programs of number N are shown in FIG. 2A) 102-1 to 102-N are stored. Each of the application programs 102-1 to 102-N has a program space and a memory address different from that of any other application program.

In the system area shown in FIG. 2A, a floppy disk (FD) driver 124, a hard disk (HD) driver 124, a serial interface (SI) driver 127, a display /printer (DP) driver 126, and a local area network (LAN) driver 128 are provided, which are respectively coupled to the floppy disk controller 166, the hard disk controller 170, the serial interface adapter 174, the display /printer adapter 176, and the local area network controller 180 shown in FIG. 2B.

Further, in the system area in FIG. 2A, a file management portion 121 is provided, which manages various kinds of files that are utilized as common information of the whole computer system and stored in floppy disks, hard disks and the like. Also, a display /printer (D/P) management portion 122 is provided, which manages operations of a display and printer. Also, a communication management portion 123 is provided, which manages various lines and a local area network.

Further, in the system area in FIG. 2A, a system library 130 is provided, which stores a large amount of files in the form of library regarding the operating system program. Also, an application management portion 131 is provided, which allows the application programs 102-1 to 102-N to be executed under the control of the operating system program. Necessary data for carrying out various process by utilizing the operating system program and the application programs 102-1 to 102-N are stored in an area for system data 150, and managed by a memory management portion 142.

Further, in the system area in FIG. 2A, an external interrupt input port 137 is provided, which receives an interrupt signal sent from the outside of the RAM 110. More specifically, in the case where a certain abnormality occurs in the peripheral equipment, a system error due to such an abnormality is adequately analyzed and processed by a floppy disk (FD) handler 132, a hard disk (HD) handler 133, a serial interface (SI) handler 134, a display /printer (DP) handler 135, and a local area network (LAN) handler 136, which are provided respectively corresponding to the floppy disk controller 166, the hard disk controller 170, the serial interface adapter 174, the display /printer adapter 176, and the local area network controller 180.

Subsequently, an interrupt signal for giving notice of the system error is sent from the involved one of the FD handler 132, the HD handler 133, SI handler 134, the DP handler 135 and the LAN handler 136 to the external interrupt input port 137.

Further, in the system area in FIG. 2A, a system call input port 120 is provided, which receives the request for the operating system program from the application programs 102-1 to 102-N.

Further, in the system area in FIG. 2A, an internal interrupt input port 144 is provided, which receives an interrupt signal sent from the application programs 102-1 to 102-N, in the case where a fault occurs in a certain application program among these application programs 102-1 to 102-N.

Further, in the system area in FIG. 2A, an interrupt output port 140 is provided, which sends to the CPU 162 an output signal obtained by adequately processing the interrupt signal from the external interrupt input port 137 or the internal interrupt input port 144.

The apparatus for controlling the computer system in FIGS. 2A and 2B illustrates a technique for carrying out the third method for controlling the computer system previously shown in FIG. 1.

Further, in the user area in FIG. 2A, a collection-procedure file which stores a procedure for collecting fault information about a fault is provided for each of the application programs 102-1 to 102-N.

Further, a substitute-procedure file is also provided for each of the application programs 102-1 to 102-N, which designates a procedure for executing a substitute process by means of a dedicated application program for processing any fault.

In this case, the dedicated application program for processing any fault (not shown in FIG. 2A) is defined as one of the application programs, and provided in a program space in the user area of the application programs 102-1 to 102-N.

In a configuration of the preferred embodiment shown in FIGS. 2A and 2B, a means for detecting the fault of the faulty application program is constituted by the operating system program and CPU 162 for controlling (running) the operating system program.

Further, a means for transferring the management information to the space for storing the management information of the dedicated application program is also constituted by the operating system program and CPU 162.

Further, a means for notifying the dedicated application program of the faulty application program and activating the dedicated application program is also constituted by the operating system program and CPU 162.

On the other hand, a means for storing the program space of the faulty application program into a given space in the dedicated application program for processing any fault is constituted by the dedicated application program, CPU 162, and MMU 160.

Further, a means for storing the program space of the faulty application program into a given space in the dedicated application program is also constituted by the dedicated application program, CPU 162 and MMU 160.

Further, a means for taking out the procedure for collecting fault information from the collection-procedure file, and storing the procedure for collecting the fault information into the space for storing the procedure for collecting the fault information is also constituted by the dedicated application program, CPU 162 and MMU 160.

Further, a means for collecting necessary information which is designated in accordance with the thus stored procedure for collecting the fault information, and storing the thus collected information into the information file is also constituted by the dedicated application program, CPU 162 and MMU 160.

Further, a means for reading out the procedure for executing the substitute process from the substitute-procedure file, and storing the procedure for executing the substitute process into the space for storing the procedure for executing the substitute process is also constituted by the dedicated application program, CPU 162 and MMU 160.

Further, a means for executing the substitute process for the request for the faulty application program in accordance with the thus stored procedure for executing the substitute process is also constituted by the dedicated application program, CPU 162 and MMU 160.

On the other hand, a means for carrying out an opening and deletion of the program space of the faulty application program, in the case where a transfer of the management information is completed, is constituted by the operating system program and CPU 162.

According to the configuration shown in FIGS. 2A and 2B, the dedicated application program for processing any fault carries out the process for collecting the fault information and the substitute process for the request for the faulty application program, in place of the operating system program. Therefore, the processing time required for the operating system program can be reduced, and it becomes possible for the operating system program to carry out a process of any other application program having higher order of priority than the faulty application program. Consequently, the utilization efficiency of the computer system as a whole can be improved.

FIG. 3 is a block diagram showing a program space in a computer system to which a preferred embodiment of the present invention is applied.

In FIG. 3, a configuration of the program space forming one portion of the system area and the user area in a computer system, as in FIGS. 2A and 2B, will be illustrated in detail.

Such a computer system has an operating system (OS) program space 1 in the system area and also program space 2-1, . . . , 2-M, . . . , 2-N respectively occupied by a plurality of application programs AP-1, ..., AP-M, ..., AP-N in the user area.

As shown in FIG. 3, the operating system program space 1 includes an application error processing unit 11 which carries out a procedure for processing an error caused by a fault in the case where the fault in a certain application program is detected by an operating system; I/O (Input/Output) control processing unit 12 which carries out the control of storage devices, e.g., a floppy disk device and a magnetic disk drive; and system error processing unit 13 which carries out a procedure for processing a system error caused by an abnormality, in the case where an abnormality occurs in the computer system.

Further, in FIG. 3, the operating system program space 1 also includes a system resource management unit 14 which which manages various resources, e.g., a real memory in the system area and any resources other than the real memory; an application management unit 15 which is similar to the application management portion in FIG. 2A and which carries out the control for operations of the computer system, such as a scheduling for execution of the application program; and a space management unit 16 which carries out a procedure for allocating the program space to the operating system program and application programs.

Further, in FIG. 3, the operating system program space 1 also includes a system common part processing unit 17 which carries out a process used in common in each of various portions of the computer system; an application request processing unit 18 which carries out a process in response to a system call, etc., representing the request for the computer system from the application programs; an external interrupt processing unit 19 which carries out an interrupt process; and an interrupt input processing unit 20 which receives an interrupt signal for the interrupt process in the case where an abnormality or fault occurs in a certain portion outside the system space.

Further, in the operating system program space 1, a system area for storing the following information is provided:

system management information 21 which represents information regarding management blocks of various system resources;

application management information 22 which represents information regarding management of a condition in which the application programs are executed; and address translation information 23 which represents information regarding an address translation for each portion of the whole program space.

Further, in the operating system program space 1, a system working area 24 is provided, which is used as a stack memory, buffer memory and the like, in the computer system.

In a preferred embodiment which is applied to the program space shown in FIG. 3, a function of carrying out a process for changing allocation of the program space to the operating system program and application programs is additionally provided in the space management unit 16 and the application request processing unit 18 (hatched portions in FIG. 3).

In the program space 2-1, 2-2, ..., 2-M, ..., 2-N for the application programs AP-1, ..., AP-M, ..., AP-N in the user area, the request for the computer system, an exception interrupt, or the like is transmitted to the operating system program space 1 as an external interrupt, via the interrupt input processing unit 20.

FIG. 4 is a block diagram showing a state of a space-address translation information in a computer system to which a technique of the present invention is applied. FIG. 5 is a block diagram showing a state of a space-address translation information in an application program of such a computer system.

The operating system program space in FIG. 4 and the program space for application programs in FIG. 5 are divided into a plurality of memory blocks. Further, a real memory, e.g., RAM is allocated for every memory block. In this case, the program space for application programs will be referred to as an application space in an abbreviated form.

In this case, various information respectively corresponding to the plurality of memory blocks has the form of a tree structure. Further, in this case, a translation table on the upstream side of the flow of information is not constituted by a real memory. Such a translation table represents a head address in each of other translation tables on the downstream side of the flow of information, which are constituted by smaller units. Further, a user, etc., can optionally determine whether each information indicates a real memory address directly or a translation table.

In the above-mentioned tree structure, as shown in FIG. 4, an address translation information area head address 31 designates a system address translation information area head address table 32 and an application space address translation information area head address 35 from the most upstream side of the flow of information. Further, the system address translation information area head address table 32 designates a system space address translation table 33.

Further, the system space address translation table 33 designates a plurality of real areas 34 respectively occupied by the memory blocks in the system space.

Further, as shown in FIG. 4, an application space address translation information area head address 35 designates an application space address translation information table 36.

As shown in FIG. 5, the application space address translation information table 36 designates a translation information table 37 in a user area occupied by each application program. Further, the translation information table 37 designates an application space address translation table 39. Further, the application space address translation table 39 designates a plurality of real areas 38 respectively occupied by the memory blocks in the application space.

More specifically, in FIG. 4, the address translation information area head address 31 represents head addresses in address translation information areas of the operating system program and application programs, which are respectively specified by the system address translation information area head address table 32 and the application space address translation information area head address 35. Also, the address translation information area head address 31 is utilized for changing the system address translation information in the system space in the case where the operating system program is executed, and the application space address translation information in the application space in the case where the application programs are executed, with each other.

Further, the system space address translation table 33 is constituted by a block #1 real memory address 33-1, a block #2 real memory address 33-2, ..., a block #N real memory address 33-N, respectively corresponding to a plurality of logic areas in the system space. The system address translation information area head address table 32 stores head addresses designated for the respective blocks #1 to #N in the system space address translation table 33. Also, the system space address translation table 33 represents addresses of the real areas 34 of real memories respectively corresponding to blocks #1 to #N in the system space.

Further, the application space address translation information table 36 is constituted by an AP-1 address translation information area head address table 36-1, an AP-2 address translation information table 36-2, . . . , an AP-N address translation information table 36-N, respectively corresponding to a plurality of application programs AP-1 to AP-N.

More specifically, in FIG. 5, the translation information table 37 is constituted by an area #1 translation information table 37-1, an area #2 translation information table 37-2, an area #3 translation information table 37-3, . . . , an area #N translation information table 37-N. Also, the translation information table 37 represents logical translation information table in user areas #1 to #N, respectively corresponding to a plurality of application programs AP-1 to AP-N.

Further, the application space address translation information table 36 stores head addresses designated for the respective user areas #1 to #N in the translation information table 37. The application space address translation table 39 is constituted by a block #1 real memory address 39-1, a block #2 real memory address 39-2, . . . , a block #N real memory address 39-N, respectively corresponding to a plurality of logic areas in the application space. Further, the translation information table 37 represents addresses of the real areas 38 of real memories, respectively corresponding to blocks #1 to #N in the application space.

Hereinafter, a detailed description regarding a method for controlling a computer system related to a preferred embodiment will be given with reference to flowcharts of FIG. 6 to FIG. 9 and diagrams of FIG. 10 to FIG. 14.

Figure 6:
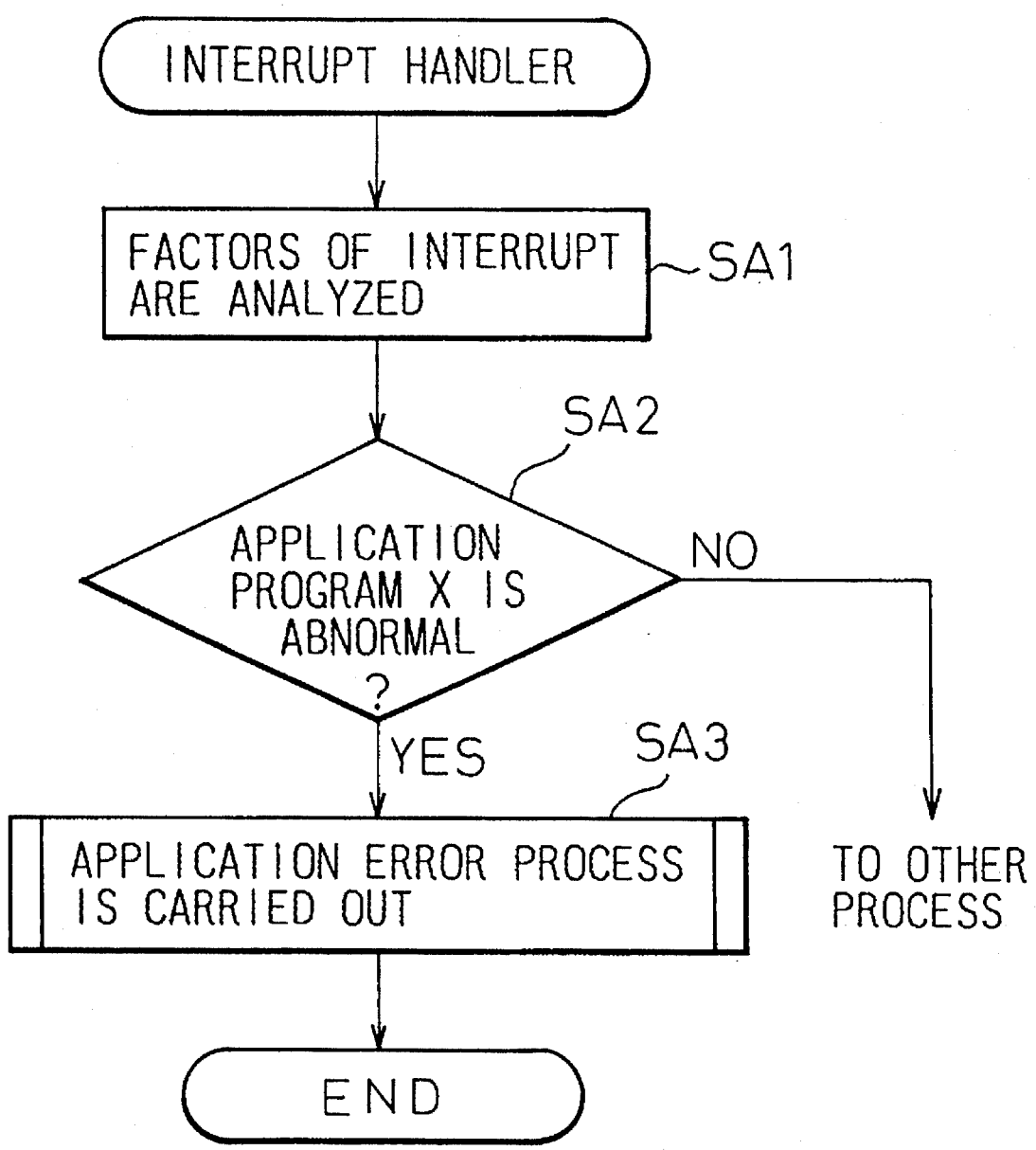
FIG. 6 is a flowchart for explaining a first part of a process of a preferred embodiment carried out in accordance with a method for controlling a computer system according to the present invention.
Figure 7:
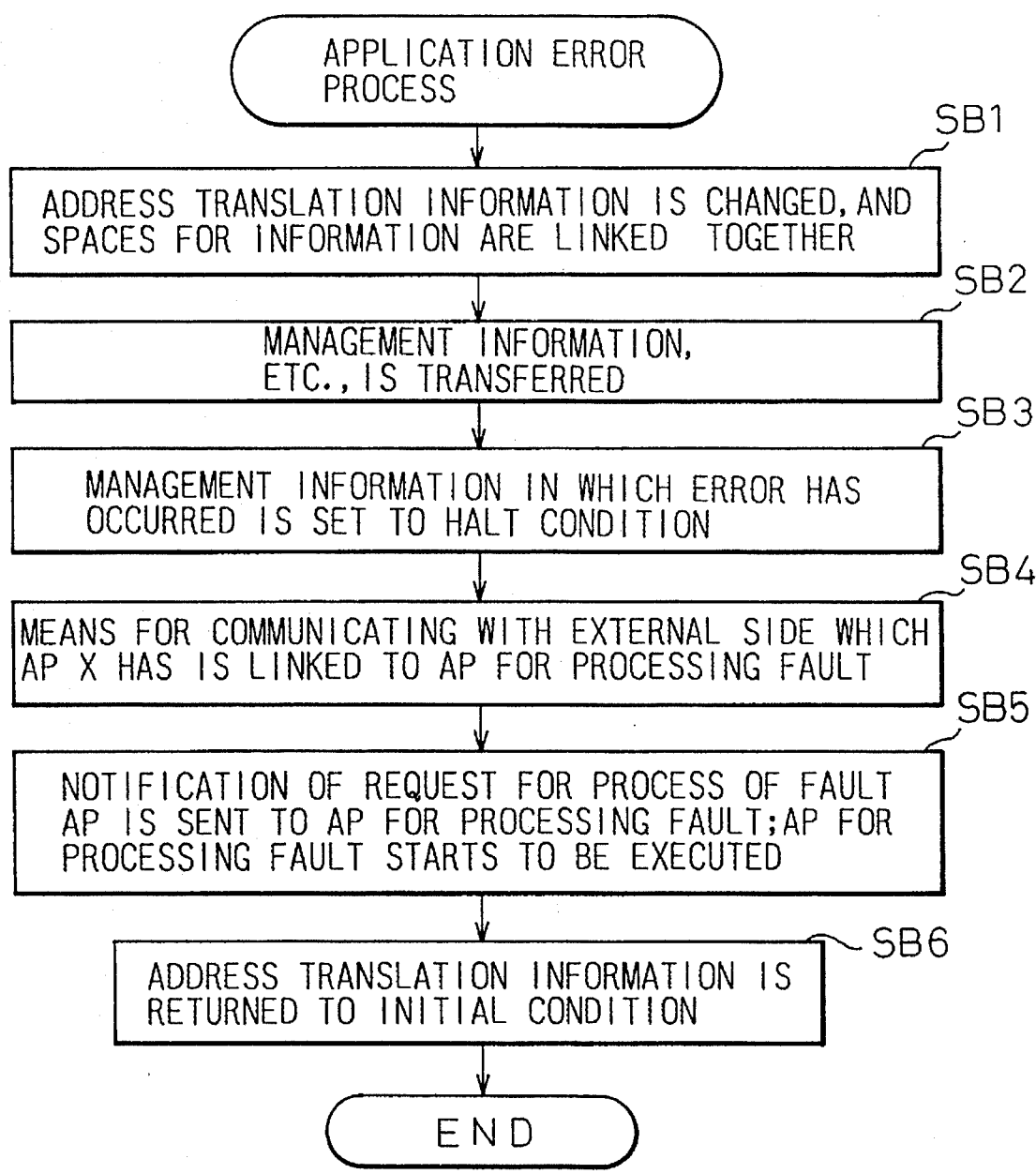
FIG. 7 is a flowchart for explaining a second part of a process of a preferred embodiment carried out in accordance with a method for controlling a computer system according to the present invention.
Figure 8:
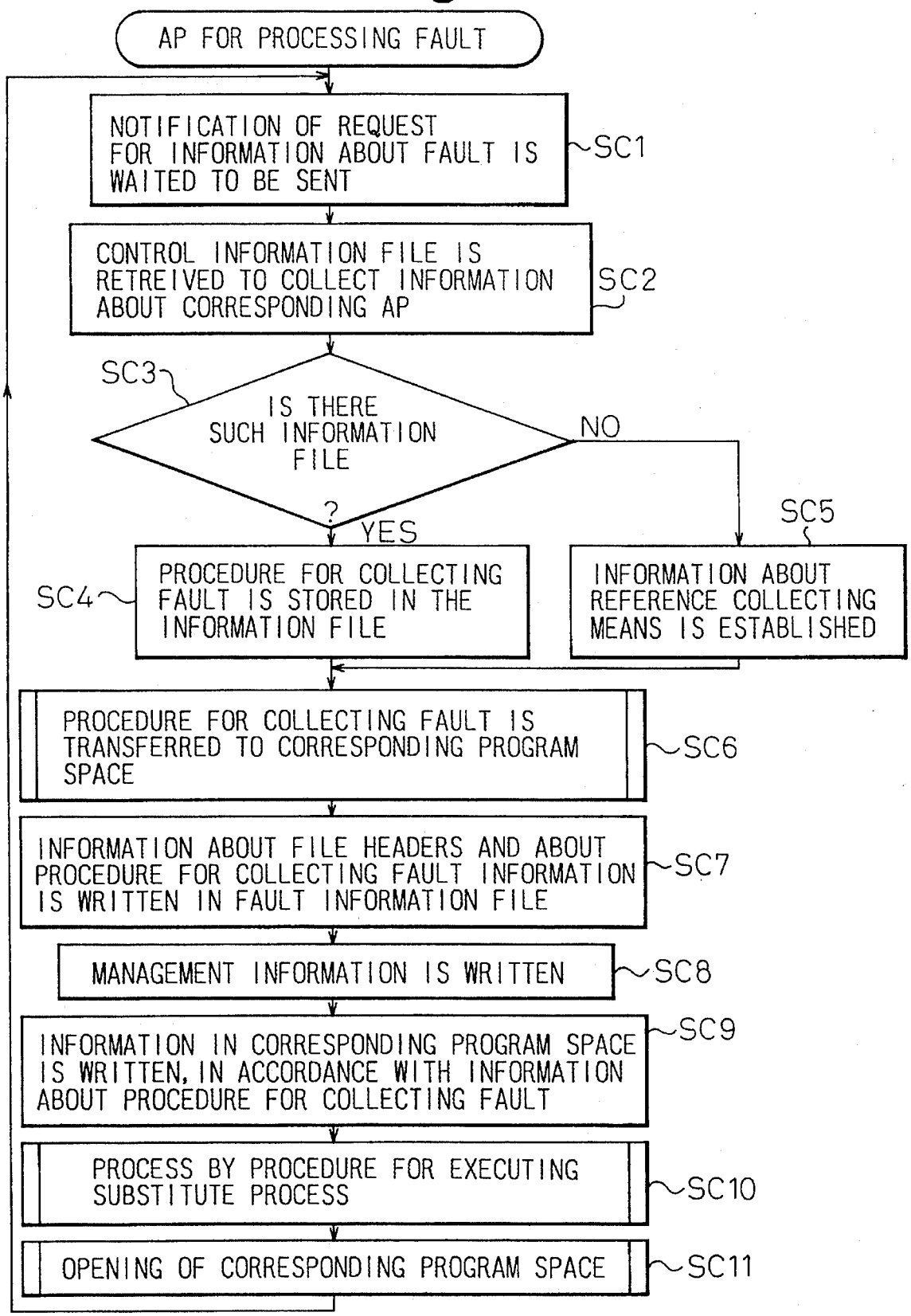
FIG. 8 is a flowchart for explaining a third part of a process of a preferred embodiment carried out in accordance with a method for controlling a computer system according to the present invention.
Figure 9:
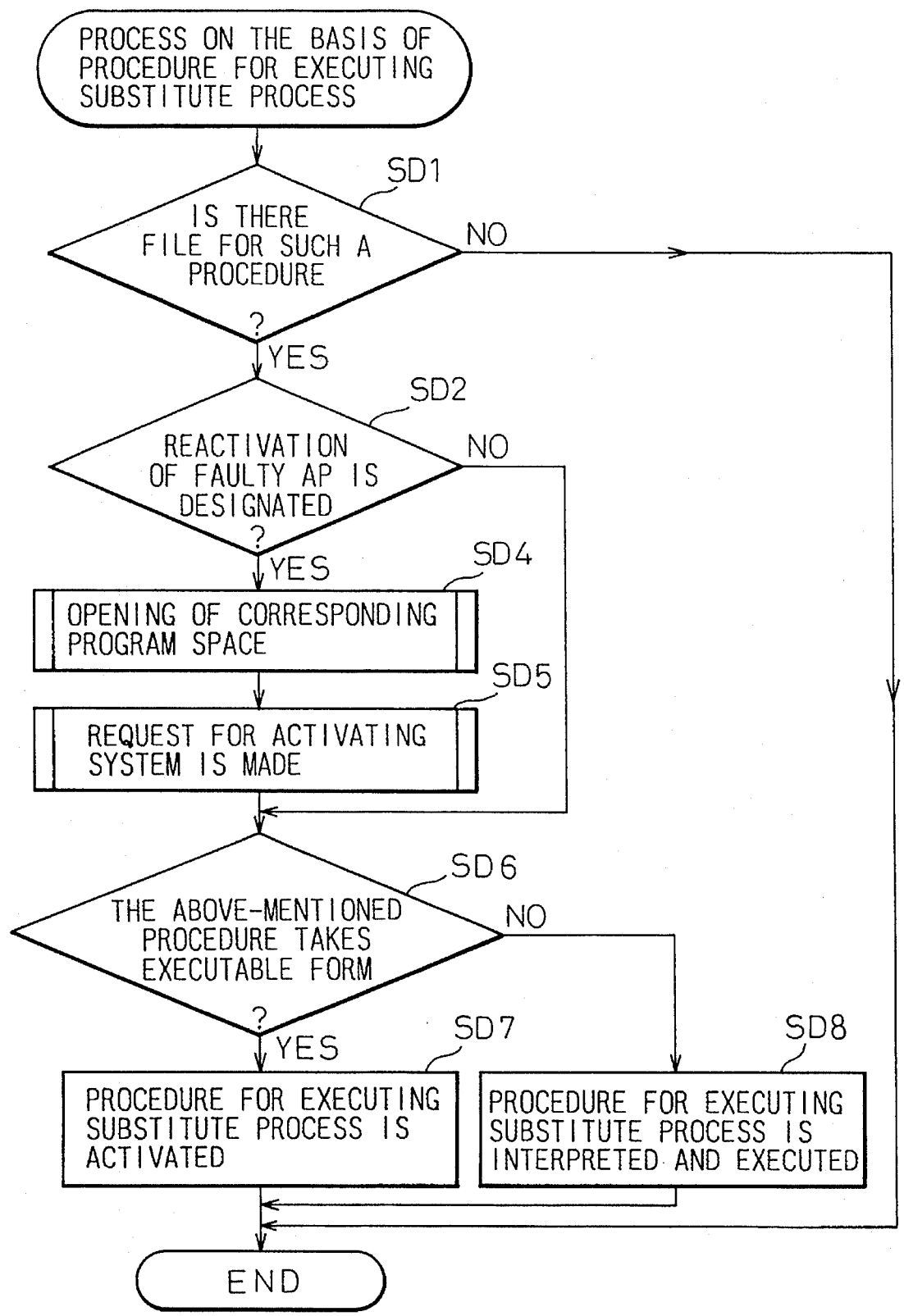
FIG. 9 is a flowchart for explaining a fourth part of a process of a preferred embodiment carried out in accordance with a method for controlling a computer system according to the present invention.

FIG. 6 is a flowchart for explaining a first part of a process of a preferred embodiment carried out in accordance with a method for controlling a computer system according to the present invention; FIG. 7 is a flowchart for explaining a second part of such a process; FIG. 8 is a flowchart for explaining a third part of such a process; and FIG. 9 is a flowchart for explaining a fourth part of such a process.

Figure 10:
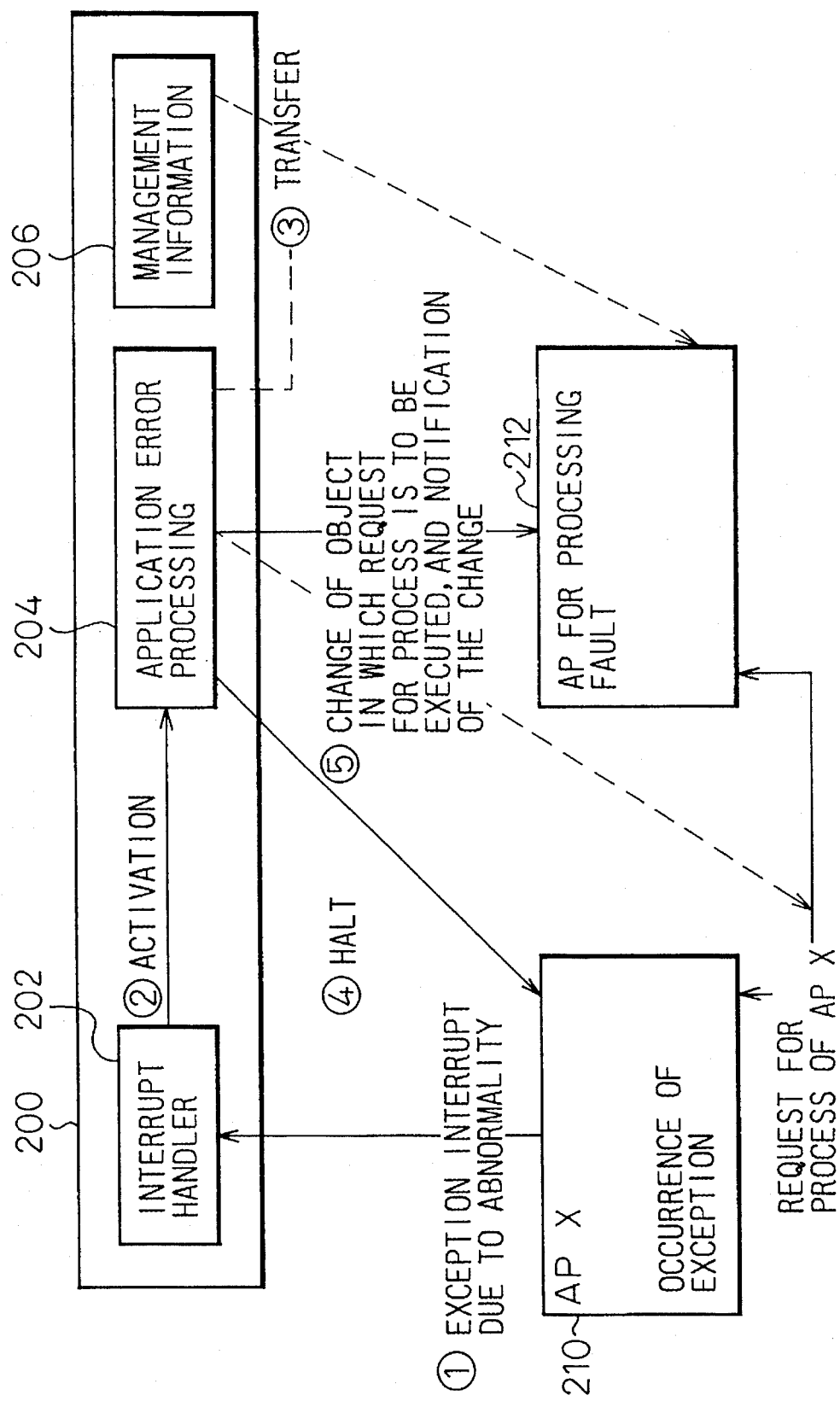
FIG. 10 is a schematic diagram for explaining the operation of an operating system in the case where a fault occurs in a certain application program in a preferred embodiment of the present invention.
Figure 11:
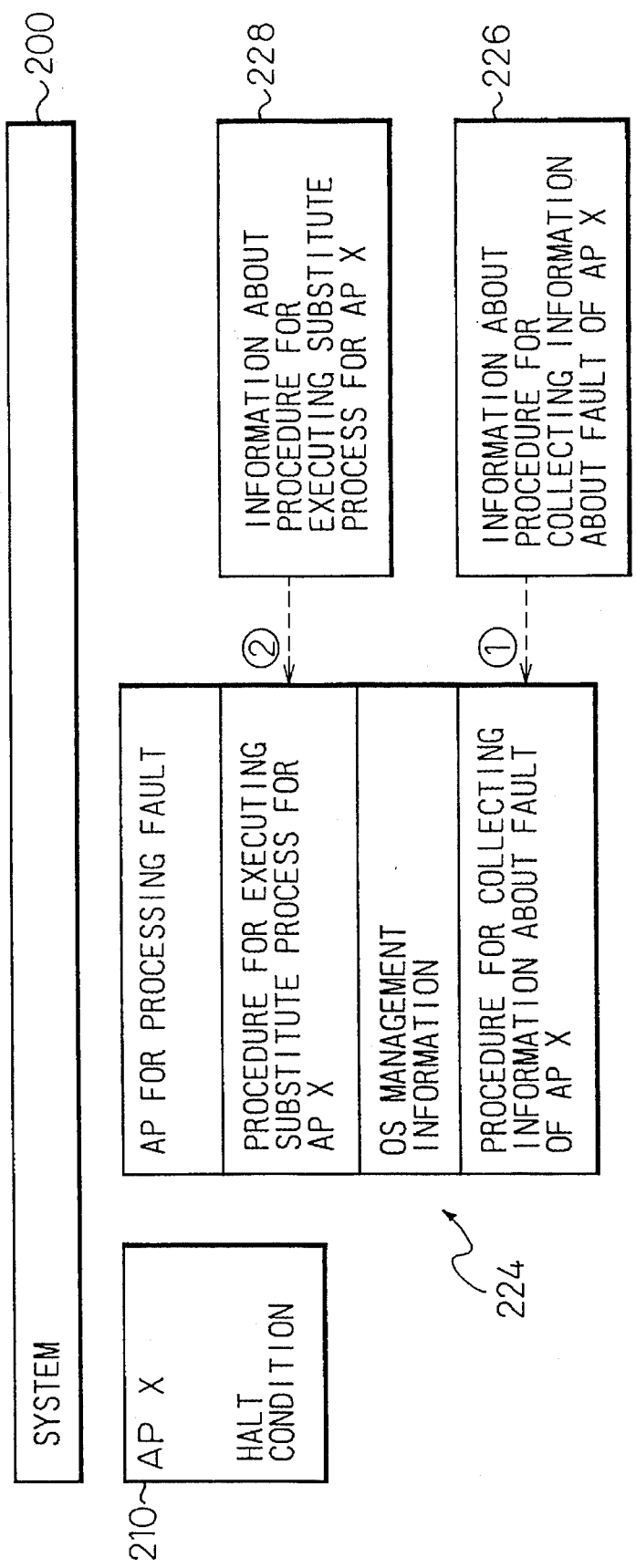
FIG. 11 is a diagram for explaining a schematic operation of an application program for processing any fault, in the case where a fault occurs in a certain application program, in a preferred embodiment of the present invention.
Figure 12:
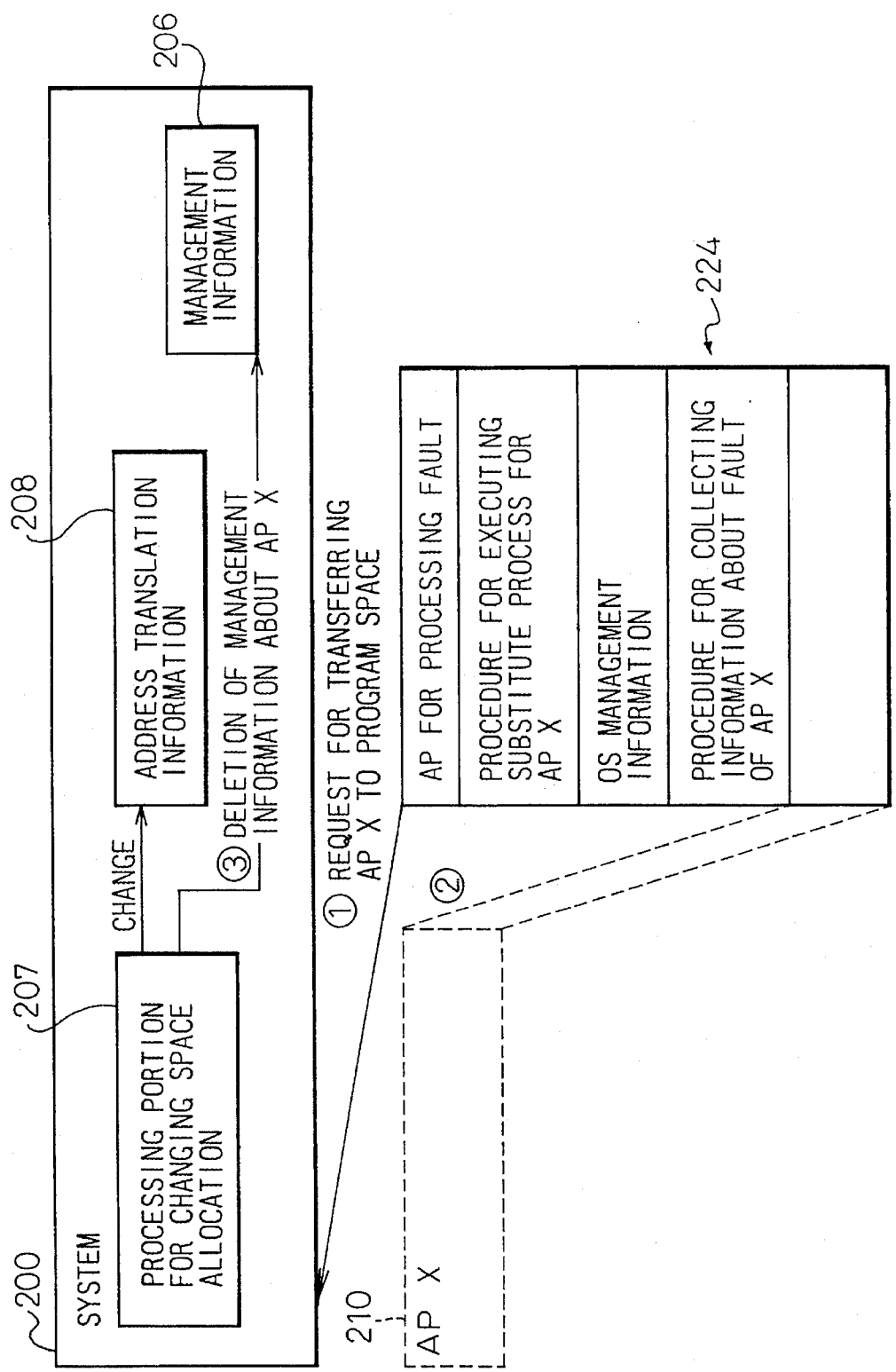
FIG. 12 is a diagram for explaining a schematic operation of an application program for processing any fault, when taking in a program space of a faulty application program, in a preferred embodiment of the present invention.
Figure 13:
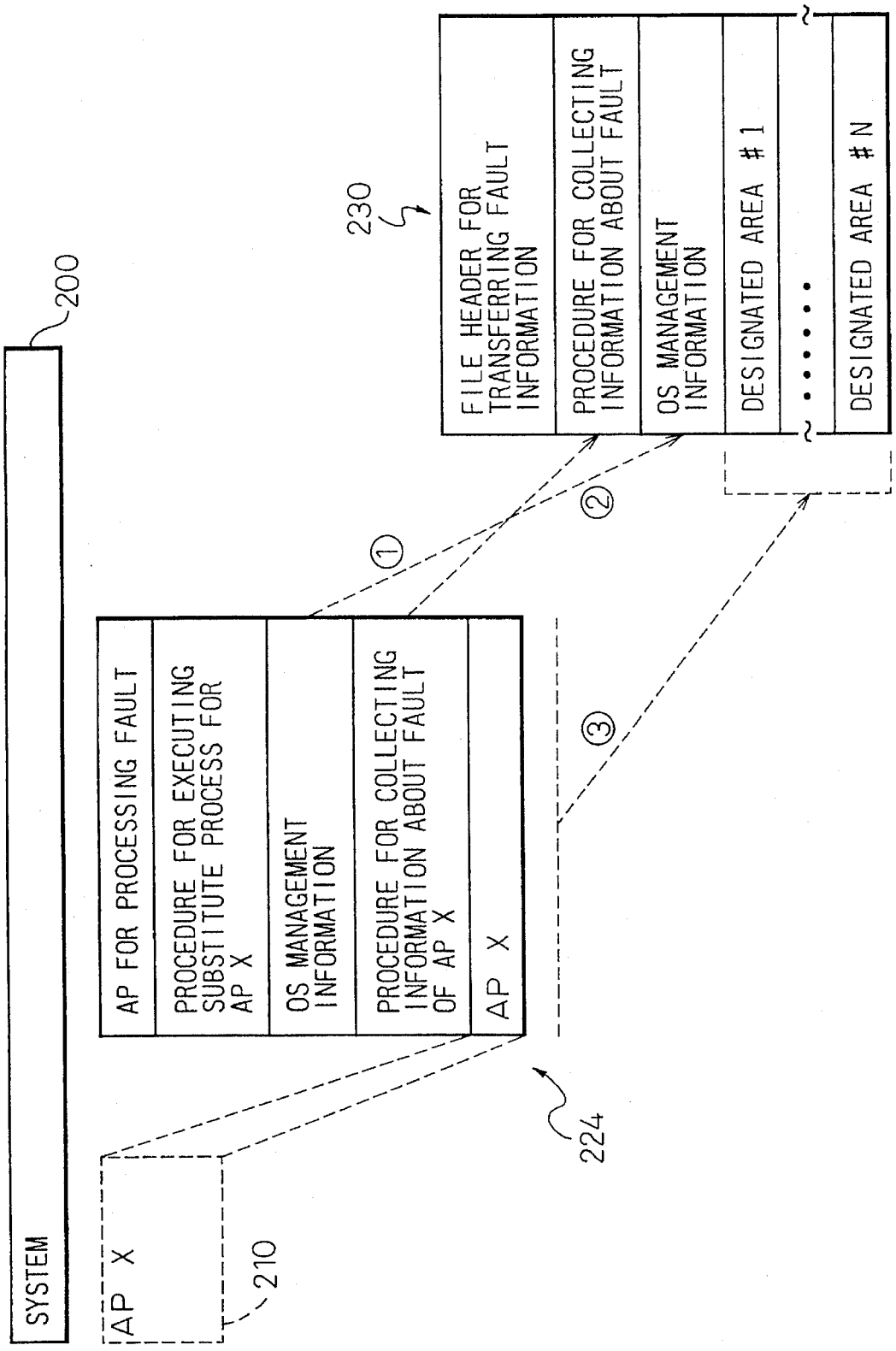
FIG. 13 is a diagram for explaining a schematic operation of an application program for processing any fault, when fault information is transferred to the application program for processing any fault, in a preferred embodiment of the present invention.
Figure 14:
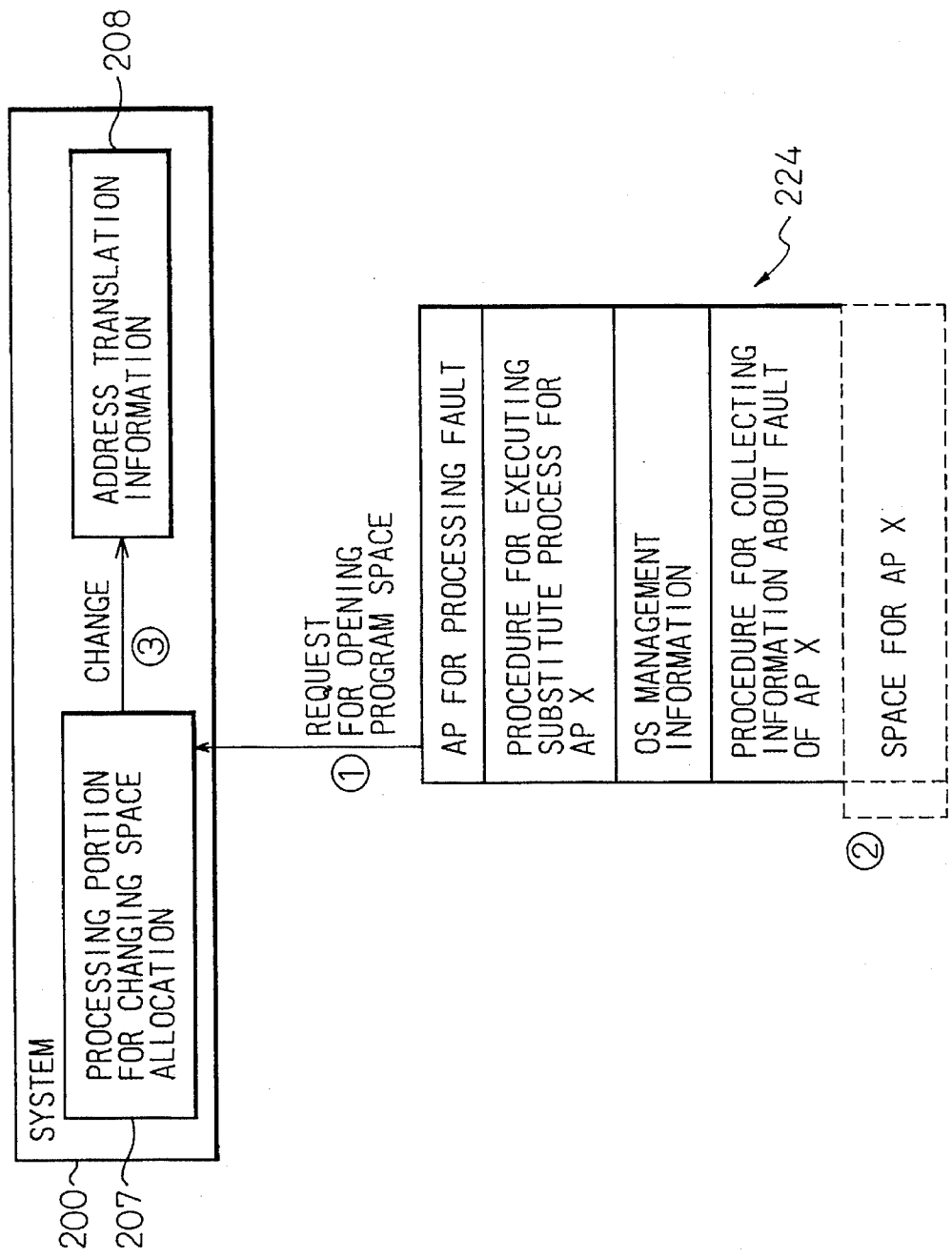
FIG. 14 is a diagram for explaining a schematic operation of an application program for processing any fault, when an opening of a program space of a faulty application program is carried out, in a preferred embodiment of the present invention.

FIG. 10 is a schematic diagram for explaining an operation of an operating system in the case where a fault occurs in a certain application program in the preferred embodiment; FIG. 11 is a diagram for explaining a schematic operation of an application program for processing any fault in the case where a fault occurs in a certain application program; FIG. 12 is a diagram for explaining a schematic operation of an application program for processing any fault when taking in a program space of a faulty application program; FIG. 13 is a diagram for explaining a schematic operation of an application program for processing any fault when fault information is transferred to the application program for processing any fault; and FIG. 14 is a diagram for explaining a schematic operation of an application program for processing any fault when an opening of a program space of a faulty application program is carried out.

Here, the preferred embodiment is directed to a technique for controlling a computer system in the case where a fault occurs in a certain application program, corresponding to the third method described before with reference to FIG. 1. Further, any component that is the same as that mentioned before will be referred to using the same reference number.

In FIG. 6 and FIG. 10, when a fault occurs in a certain application program due to some abnormality (in this case, a faulty application program in which the fault occurs will be referred to as an application program X), an exception interrupt is created by the application program X (also refer to ① of FIG. 10; the exception interrupt is transmitted from a faulty application program X 210, in which an exception occurs, through an interrupt handler 202 in a system space 200). At this time, the interrupt handler 202 is activated, and then the interrupt handler 202 starts up an application error processing portion 204 (also refer to ② of FIG. 10).

Further, in a step SA1 of FIG. 6, factors of the exception interrupt are analyzed by utilizing the interrupt handler 202.

Further, in a step SA2 of FIG. 6, it is checked whether or not the abnormality of the application program X is related to the factors of the exception interrupt. If it is confirmed that an abnormality of the application program X is related to the factors of the exception interrupt, an application error process in the application error processing portion 204 starts to be carried out. On the other hand, if it is confirmed that an abnormality of the application program X is not related to the factors of the exception interrupt, the flowchart in FIG. 6 proceeds to any process other than the application error process.

This application error process is executed by a procedure shown in FIG. 7 that will be described hereinafter.

Here, to make the operations of a computer system utilizing an address translation in the application error process easily understood, a condition of the address translation in the case where management information is transferred to a dedicated application program for processing any fault will be described with reference to FIG. 15.

Figure 15:
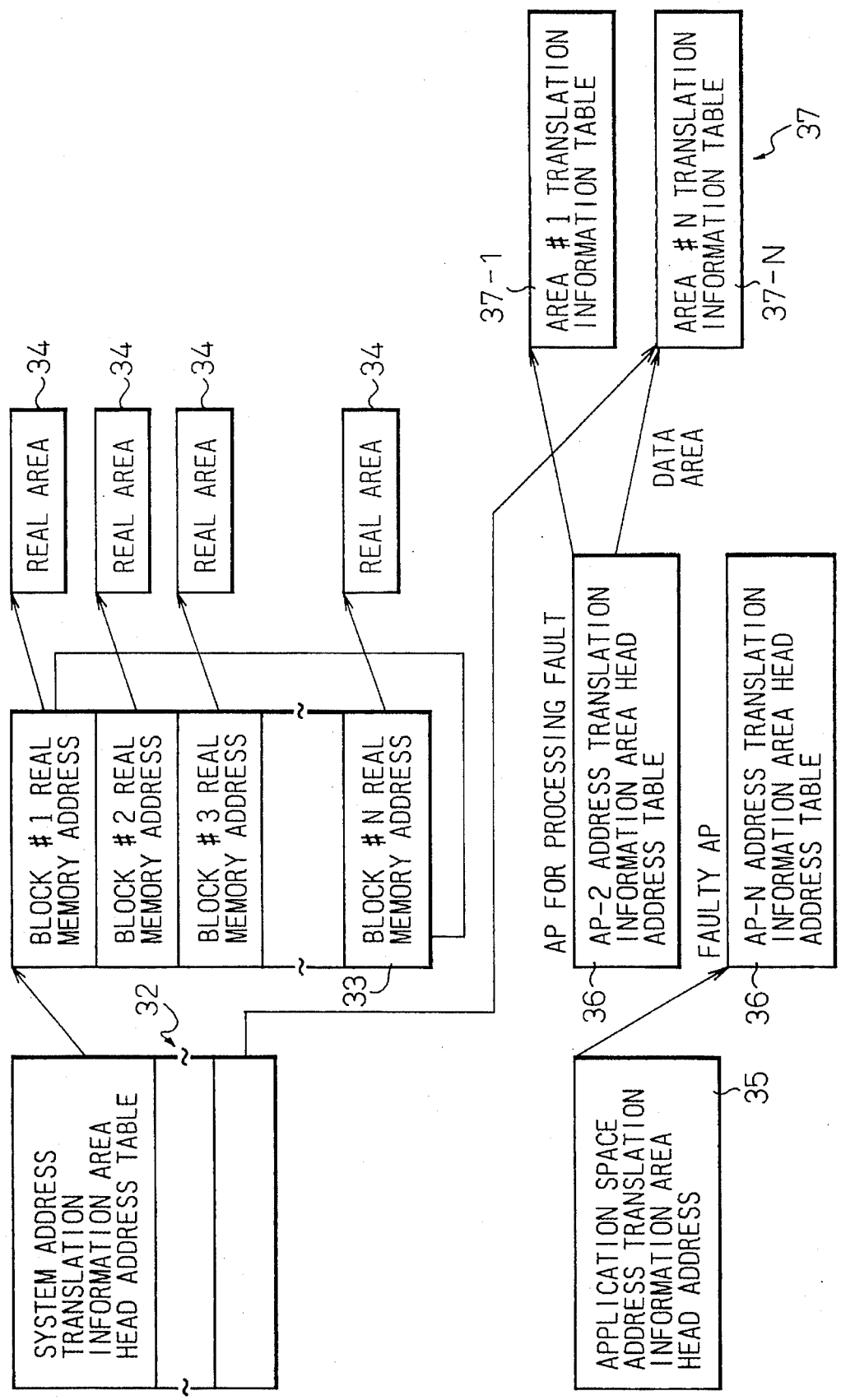
FIG. 15 is a diagram showing the state of an address translation when a management information is transferred to an application program for processing any fault, in a preferred embodiment of the present invention.

As shown in FIG. 15, it is assumed that a fault occurs in an application program AP-N. At this time, address translation information regarding the dedicated application program for processing any fault (AP-2) is transferred from an AP-2 address translation information table 36-2 to user areas (data areas) in a translation information table 37. Further, head addresses, which are designated for data areas in the translation information table 37 within the above-mentioned dedicated application program (AP-2), are stored in a system address translation information area head address table 32.

Returning to FIG. 7, as shown in a step SB1, when these head addresses are stored in a system address translation information area head address table 32, the address translation information is changed. Further, the system space and application space for address translation information are linked together.

Further, in a step SB2 of FIG. 7 and the diagram of FIG. 10, the management information 206 about the management of the operating system, the management of the faulty application program, the management of the whole computer system and the like is transferred to a program space for storing the management information of the dedicated application program for processing any fault 212 (also refer to ③ of FIG. 10).

Further, in a step SB3 of FIG. 7, management information of the application program X in which an error (i.e., a fault or failure) has occurred is set to a halt condition. Subsequently, as shown in ④ of FIG. 10, the application program X becomes in a halt condition.

Further, in a steps SB4 and SB5 of FIG. 7, a means for communicating with an external side, which the halted application program X has, is linked to the dedicated application program for processing any fault. Subsequently, the operating system notifies the dedicated application program for processing any fault of the request for a process of the halted application program X. Subsequently, a process of the dedicated application program for processing any fault starts to be carried out. Also, as shown in ⑤ of FIG. 10, the operating system changes an object, in which the request for a process of the application program X is to be executed, and notifies a CPU of the above-mentioned change.

When the process of the dedicated application program for processing any fault is completed, address translation information which has been changed in the above-mentioned step SB1 is returned to its initial condition, as shown in a steps SB6 of FIG. 7. Thus, a sequential procedure regarding the application error process is finished.

Further, the process of the dedicated application program for processing any fault will be described with reference to FIG. 8 and FIG. 11.

In a step SC1 of FIG. 8, the dedicated application program for processing any fault waits for a notification of the request, for the fault information about the fault of the application program X, to be sent.

When the dedicated application program receives the notification of the above-mentioned request, as shown in a step SC2 of FIG. 8 and ① of FIG. 11, a control information file 224 including a procedure for collecting the fault information, OS management information, and the dedicated application program is retrieved to collect information regarding a procedure for collecting the fault information of the corresponding application program (i.e., application program X). Further, information regarding a procedure for collecting the fault information of the application program X is read out. Further, the thus read information is stored in a program space of the dedicated application program for processing any fault 210.

In this embodiment, at this time, information regarding a procedure for executing a substitute process for the application program X is simultaneously taken out from the control information file 224, and stored in advance in the program space (please refer to ② of FIG. 11).

In a step SC3 of FIG. 8, it is checked whether or not there is the above-mentioned information file 224. If there is no information file, information about collecting means and substitute means based on a predetermined reference is established, as shown in a step SC5 of FIG. 8. On the other hand, if there is any information file, the related program space is read out in accordance with information regarding a procedure for collecting the fault information in the above-mentioned information file, as shown in a step SC4 of FIG. 8. Subsequently, the information about file headers and a procedure for collecting the fault information in the above-mentioned program space is written in the information file 224.

Further, in a step SC6 of FIG. 8 and a diagram of FIG. 12, the request for transferring data in a program space of the application program X is executed (also refer to ① of FIG. 12). Subsequently, this program space of the application program X is transferred to the corresponding program space of the information file 224 (also refer to ② of FIG. 12). At this time, a deletion of the management information about the application program X in the operating system is carried out (also refer to ③ of FIG. 12). In this case, in accordance with a control of a processing portion for changing a system space allocation 207, address translation information 208 is changed.

Here, to make the operations of a computer system for taking in the program space of the application program X easily understood, a condition of the address translation in the case where the management information is transferred to a dedicated application program for processing any fault will be described with reference to FIG. 16.

Figure 16:
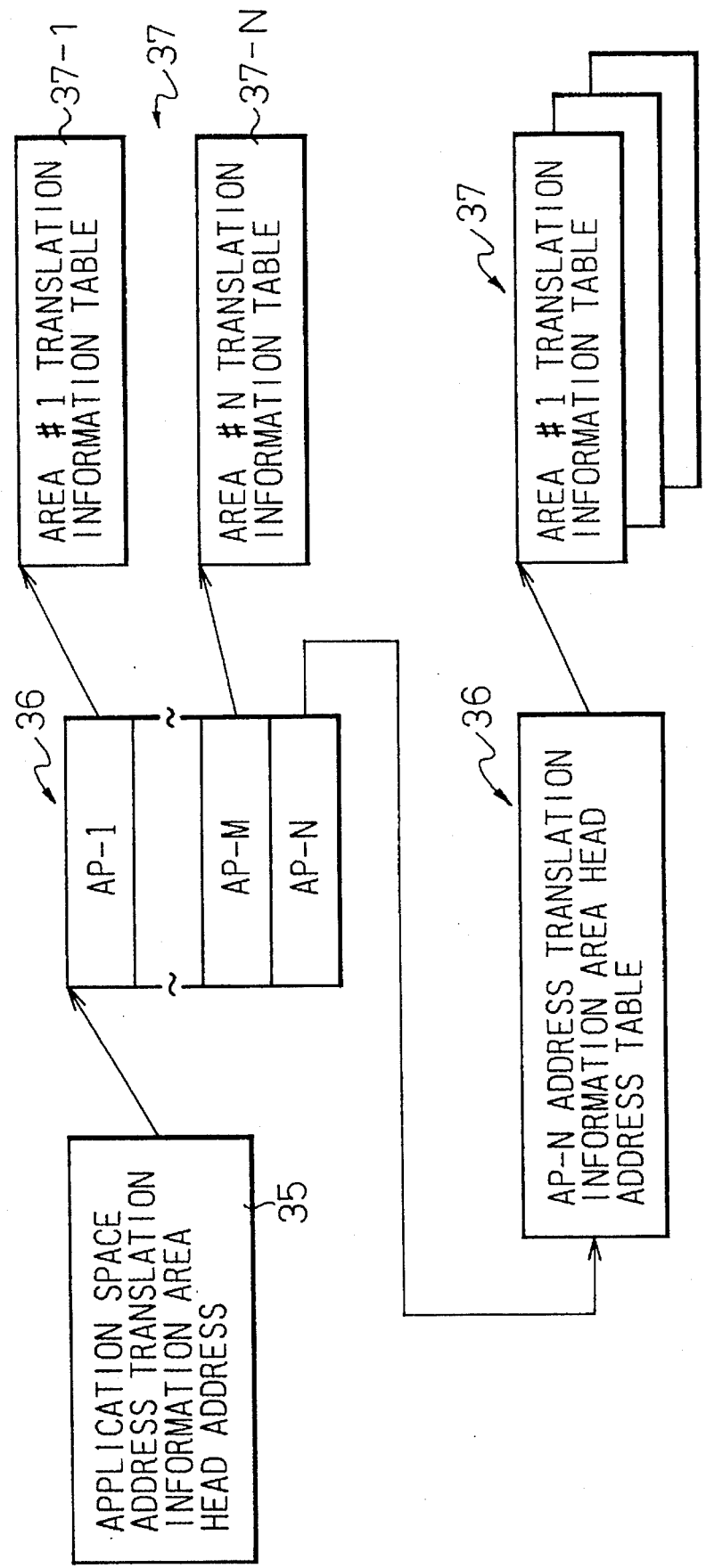
FIG. 16 is a diagram showing the state of an address translation when a program space of a faulty application programs is taken in an application program for processing any fault, in a preferred embodiment of the present invention.

As shown in FIG. 16, a process for taking in the program space of the application program X is carried out by designating head addresses of an application space address translation information table 36 of the application program X (AP-N), on an application space address translation information table 36 of the dedicated application program for processing any fault, and by changing the contents of a translation information table.

Further, in a steps SC7 and SC8 of FIG. 8 and a diagram of FIG. 13, the dedicated application program for processing any fault writes information about file headers, information about a procedure for collecting a fault information, and OS management information in a file 230 for transferring fault information (also refer to ① and ② of FIG. 13).

Further, in a step SC9 of FIG. 8 and a diagram of FIG. 13, in accordance with the information about a procedure for collecting fault information or the reference procedure for collecting fault information, fault information in the corresponding program space of the application program X is adequately edited and written in designated areas #1 to #N of the file 230 for transferring fault information (also refer to ③ of FIG. 13).

Further, in this embodiment, as shown in a step SC10 of FIG. 8, in accordance with the information regarding a procedure for executing a substitute process for an application program X stored in the above-mentioned step SC2, the request for an application program X regarding an execution of pending process is actually processed. Here, in the case where a procedure for executing the substitute process is not designated in advance, such the request is recorded in accordance with a reference procedure for executing the substitute process. At this time, a source, from which the above-mentioned request is made, is notified that an abnormality has occurred in the procedure for executing the substitute process.

Returning to FIG. 8, as shown in a step SC11, an opening of the corresponding program space in the application program X is carried out. Consequently, the open program space again can wait for a notification of the request for any process. As shown in FIG. 14, such an opening of the corresponding program space is executed by instructing the dedicated application program to open the program space in which the application program X is taken (please refer to ① and ② of FIG. 14). Any program space, which has become unused as a result of an opening of the corresponding program space, can be allocated to the other application programs at the request of the operating system.

Figure 17:
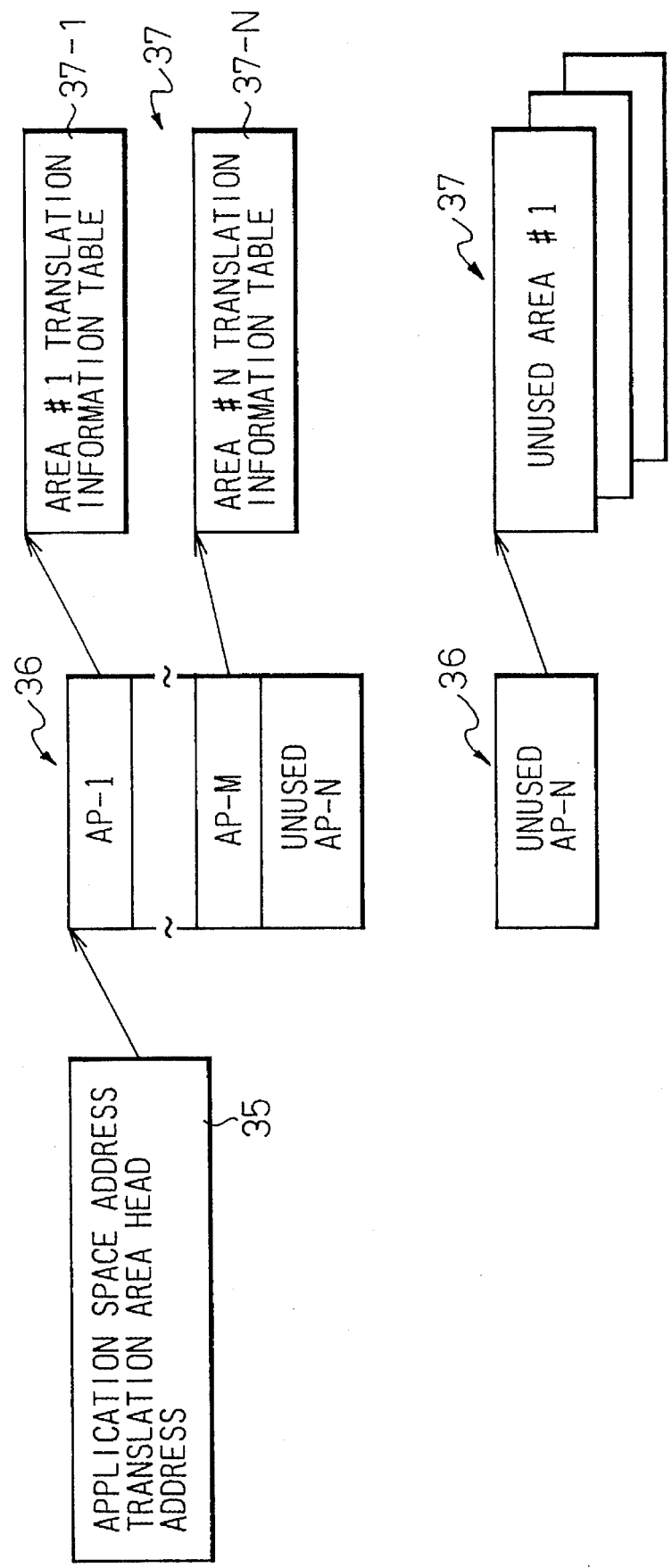
FIG. 17 is a diagram showing the state of an address translation when an application program for processing any fault carries out an opening of a program space of a faulty application program, in a preferred embodiment of the present invention.

Further, as shown in FIG. 17, a given application space address translation information table 36 corresponds to the faulty application program AP-N. Therefore, the given application space address translation information table 36 can be allocated for constituting the space of the other application programs (please refer to ③ of FIG. 14).

In the case where a reactivation of the application program X is to be carried out while the above-mentioned substitute process is being executed, as shown in FIG. 9, it is checked whether or not there is a file for such a substitute process (a step SD1). Further, it is also checked whether or not a reactivation of the application program X is designated (a step SD2).

In the case where there is a file for such a substitute process and also a reactivation of the application program X is designated, as shown in a step SD4, an opening of the corresponding program space in the application program x is carried out. Further, in a step SD5, the request for activating the operating system is made.

In the case where the above-mentioned procedure takes an executable form (a step SD6), a procedure for executing a substitute process is activated (a step SD7). On the other hand, in the case where the above-mentioned procedure does not take an executable form, a procedure for executing a substitute process is interpreted and executed (a step SD8). By carrying out such a process, the computer system returns to a normal condition, similar to an initial state, in the case where a fault of a certain application program is not a fixed (or predetermined) type of fault.

According to this embodiment of the present invention, fault information regarding a fault of the faulty application program is collected by the dedicated application program operating in user mode, not by the operating system program. Therefore, it becomes possible for the operating system program to carry out a process of any other application program having a higher order of priority than the faulty application program.

Further, the processing time required for the operating system program can be reduced, and it becomes possible to carry out a substitute process which is suitable for an object of each application program. Consequently, it becomes possible to adequately handle a fault of a given application program without lowering the operational efficiency of the whole computer system.

Further, in regard to a collection of fault information, necessary information can be collected in a procedure for processing fault information which is suitable for each application program. Therefore, it becomes possible for individual fault information in the respective application programs to be collected.

In other words, the fault information, which was collected only for one generation due to the upper limit of file memory capacity in the prior art, can be collected for a plurality of generations in the embodiment, by adequately selecting the information that is to be collected. Therefore, it becomes possible to accurately and rapidly address a fault in a given application program.

Further, according to the above-mentioned embodiment, extra information is prevented from being collected. Therefore, the size of a memory unit and an external storage device can be decreased. Also, the time required for taking out necessary information from the memory unit, etc., or the time required for transferring the information to other computer systems, can be remarkably reduced.

In the above-mentioned embodiment of the present invention, a detailed description has been given regarding some examples in which the present invention is applied to a computer system utilizing an address translation. However, it should be noted that the present invention can be applied any type of computer system in which an operating system program and one or a plurality of application programs can be handled separate from each other, regardless of a method of an address translation.

While the present invention has been described as related to the preferred embodiments, it will be understood that various changes and modifications may be made without departing from the spirit and the scope of the invention as hereinafter claimed.

I claim:

1. A method for controlling a computer system having an operating system program that constitutes a given operating system and that carries out control of operations of said computer system as a whole and also having one or a plurality of application programs that are executable by said operating system and which are separate from said operating system program, the method being operable in a case in which a fault occurs in an application program, thereby designated a faulty application program, among said plurality of application programs having respective and different, plural address spaces, wherein:

a collection-procedure file, which stores a procedure for collecting fault information about a fault, is provided for every application program, as well as an information file for storing said fault information and other information, said other information indicating the type of said fault information that is to be collected when a fault occurs and also indicating a procedure for collecting said fault information that is to be collected when said fault occurs, a dedicated application program for processing any fault, defined as one of said application programs, is provided in a corresponding program space of said application programs, said dedicated application program having a first related space for storing management information about management of said operating system, a second related space for storing a program space of a faulty application program in which said fault occurs, and a third related space for storing said procedure for collecting said fault information, said dedicated application program executing a given control process for any selected one of the other application programs when said fault occurs in said selected one of the other application programs, and said operating system having functions of excepting said selected one of the other application programs from the management by said operating system to control execution of said application programs, of transferring the program space of said selected one of the other application programs to the program space of said dedicated application program having said third related space for storing said procedure for collecting said fault information and, further, of carrying out an opening and deletion of the program space of said selected one of the other application programs which has a fault, said method comprising:

dividing a program space of said operating system program and the program space of said application programs into a plurality of memory blocks, and allocating a real memory for every memory block;

detecting a fault of a certain application program corresponding to said faulty application program, by means of said operating system;

transferring said management information, including application management information of said faulty application program, to said first related space for storing said management information of said dedicated application program for processing any fault, by means of said operating system;

notifying said dedicated application program for processing any fault of said faulty application program and activating said dedicated application program for processing any fault, by means of said operating system;

storing the program space of said faulty application program, which is designated by said operating system, into said second related space for storing the program space of said faulty application program in said dedicated application program for processing any fault, by means of said dedicated application program for processing any fault;

selecting said procedure for collecting said fault information from said collection-procedure file, and storing said procedure for collecting said fault information into said third related space for storing said procedure for collecting said fault information, by means of said dedicated application program for processing any fault;

collecting necessary information which is designated in accordance with the stored procedure for collecting said fault information and storing the collected necessary information into said information file, by means of said dedicated application program; and carrying out an opening and deletion of the program space of said faulty application program, which has been stored into said second related space for storing the program space of said faulty application program in said dedicated application program for processing any fault, when the step of transferring of said management information is completed, by means of said operating system.

2. A method for controlling a computer system having an operating system program that constitutes a given operating system and that carries out control of operations of said computer system as a whole and also having one or a plurality of application programs that are executable on said operating system and which are separate from said operating system program, the method being operable in a case in which a fault occurs in an application program, thereby designated a faulty application program, among said plurality of application programs having respective and different, plural address spaces, wherein:

a substitute-procedure file, provided for every application program, designates a procedure for executing a substitute process by means of a dedicated application program for processing any fault, said dedicated application program for processing any fault, defined as one of said application programs, is provided in a corresponding program space of said application programs, said dedicated application program having a first related space for storing management information about management of said operating system, a second related space for storing a program space of a faulty application program in which said fault occurs, and a third related space for storing said procedure for executing said substitute process, said dedicated application program executing a given control process for any selected one of the other application programs when said fault occurs in said selected one of the other application programs, and said operating system having functions of excepting said selected one of the other application programs from the management by said operating system to control execution of said application programs, of transferring the program space of said selected one of the other application programs to the program space of said dedicated application program having said third related space for storing said procedure for collecting said fault information and, further, of carrying out an opening and deletion of the program space of said selected one of the other application programs which has a fault, said method comprising:

dividing a program space of said operating system program and the program space of said application programs into a plurality of memory blocks, and allocating a real memory for every memory block;

detecting a fault of a certain application program corresponding to said faulty application program, by means of said operating system;

transferring said management information, including application management information of said faulty application program, to said first related space for storing said management information of said dedicated application program for processing any fault, by means of said operating system;

notifying said dedicated application program for processing any fault of said faulty application program and activating said dedicated application program for processing any fault, by means of said operating system;

storing the program space of said faulty application program, which is designated by said operating system, into said second related space for storing the program space of said faulty application program in said dedicated application program for processing any fault, by means of said dedicated application program for processing any fault;

reading out said procedure for executing said substitute process from said substitute-procedure file, and storing said procedure for executing said substitute process into said third related space for storing said procedure for executing said substitute process, by means of said dedicated application program for processing any fault;

executing said substitute process for the request for said faulty application program in accordance with the stored procedure for executing said substitute process by means of said dedicated application program; and carrying out an opening and deletion of the program space of said faulty application program, which has been stored into said second related space for storing the program space of said faulty application program in said dedicated application program for processing any fault, when the step of transferring of said management information is completed, by means of said operating system.

3. A method for controlling a computer system having an operating system program that constitutes a given operating system and that carries out control of operations of said computer system as a whole and also having one or a plurality of application programs that are executable by said operating system and which are separate from said operating system program, the method being operable in a case in which a fault occurs in an application program, thereby designated a faulty application program, among said plurality of application programs having respective and different, plural address spaces, wherein:

a collection-procedure file, which stores a procedure for collecting fault information about a fault, is provided for every application program, as well as an information file for storing said fault information and other information, said other information indicating the type of said fault information that is to be collected when a fault occurs and also indicating a procedure for collecting said fault information that is to be collected when said fault occurs, a substitute-procedure file is also provided for every application program, which designates a procedure for executing a substitute process by means of a dedicated application program for processing any fault, said dedicated application program for processing any fault, defined as one of said application programs, is provided in a corresponding program space of said application programs, said dedicated application program having a first related space for storing management information about management of said operating system, a second related space for storing a program space of a faulty application program in which said fault occurs, a third related space for storing said procedure for collecting said fault information, and a third related space for storing said procedure for executing said substitute process, said dedicated application program executing a given control process for any selected one of the other application programs when said fault occurs in said selected one of the other application programs, and said operating system has functions of excepting said selected one of the other application programs from the management by said operating system to control execution of said application programs, of transferring the program space of said selected one of the other application programs to the program space of said dedicated application program having said third related space for storing said procedure for collecting said fault information and, further, of carrying out an opening and deletion of the program space of said selected one of the other application programs which has a fault, said method comprising:

dividing a program space of said operating system program and the program space of said application programs into a plurality of memory blocks, and allocating a real memory for every memory block;

detecting a fault of a certain application program corresponding to said faulty application program, by means of said operating system;

transferring said management information, including application management information of said faulty application program, to said first related space for storing said management information of said dedicated application program for processing any fault, by means of said operating system;

notifying said dedicated application program for processing any fault of said faulty application program and activating said dedicated application program for processing any fault, by means of said operating system;

storing the program space of said faulty application program, which is designated by said operating system, into said second related space for storing the program space of said faulty application program in said dedicated application program for processing any fault, by means of said dedicated application program for processing any fault;

selecting said procedure for collecting said fault information from said collection-procedure file, and storing said procedure for collecting said fault information into said third related space for storing said procedure for collecting said fault information, by means of said dedicated application program for processing any fault;

collecting necessary information which is designated in accordance with the stored procedure for collecting said fault information and storing the collected necessary information into said information file, by means of said dedicated application program;

reading out said procedure for executing said substitute process from said substitute-procedure file, and storing said procedure for executing said substitute process into said third related space for storing said procedure for executing said substitute process, by means of said dedicated application program for processing any fault;

executing said substitute process for the request for said faulty application program in accordance with the stored procedure for executing said substitute process, by means of said dedicated application program; and carrying out an opening and deletion of the program space of said faulty application program, which has been stored into said second related space for storing the program space of said faulty application program in said dedicated application program for processing any fault, when the step of transferring of said management information is completed, by means of said operating system.

4. An apparatus for controlling a computer system having an operating system program that constitutes a given operating system and that carries out control of operations of said computer system as a whole and also having one or a plurality of application programs that are executable by said operating system and which are separate from said operating system program, the apparatus being operable in a case in which a fault occurs in an application program, thereby designated a faulty application program, among said plurality of application programs having respective and different, plural address spaces, wherein:

a collection-procedure file, which stores a procedure for collecting fault information about a fault, is provided for every application program, as well as an information file for storing said fault information and other information, said other information indicating the type of said fault information that is to be collected when a fault occurs and also indicating a procedure for collecting said fault information that is to be collected when said fault occurs, and a dedicated application program for processing any fault, defined as one of said application programs, is provided in a corresponding program space of said application programs, said dedicated application program having a first related space for storing management information about management of said operating system, a second related space for storing a program space of a faulty application program in which said fault occurs, and a third related space for storing said procedure for collecting said fault information, said dedicated application program executing a given control process for any selected one of the other application programs when said fault occurs in said selected one of the other application programs, said apparatus comprising:

a plurality of memory blocks into which a program space of said operating system program and the program space of said application programs are divided, a corresponding real memory being allocated for every memory block;

means for detecting a fault of a certain application program corresponding to said faulty application program;

means for transferring said management information, including application management information of said faulty application program, to said first related space for storing said management information of said dedicated application program for processing any fault;

means for notifying said dedicated application program for processing any fault of said faulty application program and activating said dedicated application program for processing any fault;

means for storing the program space of said faulty application program, which is designated by said operating system, into said second related space for storing the program space of said faulty application program in said dedicated application program for processing any fault;

means for selecting said procedure for collecting said fault information from said collection-procedure file, and storing said procedure for collecting said fault information into said third related space for storing said procedure for collecting said fault information;

means for collecting necessary information which is designated in accordance with said procedure for collecting said fault information, and storing the thus collected necessary information into said information file; and means for carrying out an opening and deletion of the program space of said faulty application program, which has been stored into said second related space for storing the program space of said faulty application program in said dedicated application program for processing any fault, in the case where it is confirmed that the transfer of said management information is completed.

5. An apparatus for controlling a computer system having an operating system program that constitutes a given operating system and that carries out control of operations of said computer system as a whole and also having one or a plurality of application programs that are executable by said operating system and which are separate from said operating system program, the apparatus being operable in a case in which a fault occurs in an application program, thereby designated a faulty application program, among said plurality of application programs having respective and different, plural address spaces, wherein:

a substitute-procedure file, provided, for every application program, designates a procedure for executing a substitute process by means of a dedicated application program for processing any fault, and said dedicated application program for processing any fault, defined as one of said application programs, is provided in a corresponding program space of said application programs, said dedicated application program having a first related space for storing management information about management of said operating system, a second related space for storing a program space of a faulty application program in which said fault occurs, and a third related space for storing said procedure for executing said substitute process, said dedicated application program executing a given control process for any selected one of the other application programs when said fault occurs in said selected one of the other application programs, said apparatus comprising:

a plurality of memory blocks into which a program space of said operating system program and the program space of said application programs are divided, a corresponding real memory being allocated for every memory block;

means for detecting a fault of a certain application program corresponding to said faulty application program;

means for transferring said management information, including application management information of said faulty application program, to said first related space for storing said management information of said dedicated application program for processing any fault;

means for notifying said dedicated application program for processing any fault of said faulty application program and activating said dedicated application program for processing any fault;

means for storing the program space of said faulty application program, which is designated by said operating system, into said second related space for storing the program space of said faulty application program in said dedicated application program for processing any fault;

means for reading out said procedure for executing said substitute process from said substitute-procedure file, and storing said procedure for executing said substitute process into said third related space for storing said procedure for executing said substitute process;

means for executing said substitute process for the request for said faulty application program in accordance with said stored procedure for executing said substitute process; and means for carrying out an opening and deletion of the program space of said faulty application program, which has been stored into said second related space for storing the program space of said faulty application program in said dedicated application program for processing any fault, when the step of transferring of said management information is completed.

6. An apparatus for controlling a computer system having an operating system program that constitutes a given operating system and that carries out control of operations of said computer system as a whole and also having one or a plurality of application programs that are executable by said operating system and which are separate from said operating system program, the apparatus being operable in a case in which a fault occurs in an application program, thereby designated a faulty application program, among said plurality of application programs having respective and different, plural address spaces, wherein:

a collection-procedure file, which stores a procedure for collecting fault information about a fault, is provided for every application program, as well as an information file for storing said fault information and other information, said other information indicating the type of said fault information that is to be collected when a fault occurs and also indicating a procedure for collecting said fault information that is to be collected when said fault occurs, a substitute-procedure file is also provided, for every application program, which designates a procedure for executing a substitute process by means of a dedicated application program for processing any fault, and said dedicated application program for processing any fault, defined as one of said application programs, is provided in a corresponding program space of said application programs, said dedicated application program having a first related space for storing management information about management of said operating system, a second related space for storing a program space of a faulty application program in which said fault occurs, a third related space for storing said procedure for collecting said fault information, and a third related space for storing said procedure for executing said substitute process, said dedicated application program executing a given control process for any selected one of the other application programs when said fault occurs in said selected one of the other application programs, said apparatus comprising:

a plurality of memory blocks into which a program space of said operating system program and the program space of said application programs are divided, a corresponding real memory being allocated for every memory block;

means for detecting a fault of a certain application program corresponding to said faulty application program;

means for transferring said management information, including application management information of said faulty application program, to said first related space for storing said management information of said dedicated application program for processing any fault;

means for notifying said dedicated application program for processing any fault of said faulty application program and activating said dedicated application program for processing any fault;

means for storing the program space of said faulty application program, which is designated by said operating system, into said second related space for storing the program space of said faulty application program in said dedicated application program for processing any fault;

means for taking out said procedure for collecting said fault information from said collection-procedure file, and storing said procedure for collecting said fault information into said third related space for storing said procedure for collecting said fault information;

means for collecting necessary information which is designated in accordance with the thus stored procedure for collecting said fault information and storing the collected necessary information into said information file;

means for reading out said procedure for executing said substitute process from said substitute-procedure file, and storing said procedure for executing said substitute process into said third related space for storing said procedure for executing said substitute process;

means for executing said substitute process for the request for said faulty application program in accordance with said stored procedure for executing said substitute process; and means for carrying out an opening and deletion of the program space of said faulty application program, which has been stored into said second related space for storing the program space of said faulty application program in said dedicated application program for processing any fault, when the transfer of said management information is completed.

* * * * *

UNITED STATES PATENT AND TRADEMARK OFFICE
CERTIFICATE OF CORRECTION

PATENT NO.  : 5,537,539
DATED       : Jul. 16, 1996
INVENTOR(S) : NARIHIRO

It is certified that error appears in the above-indentified patent and that said Letters Patent is hereby corrected as shown below:

Col. 1,   line 37, delete "case".

Col. 2,   line 7, delete the paragraph indention.

Col. 10,  line 29, change "HD#2" to --HD#1--.

Col. 17,  line 7, change "a steps" to --step--.

Col. 18,  line 63, change "program x" to --program X--.

Signed and Sealed this

Seventh Day of January, 1997

Attest:

BRUCE LEHMAN

*Attesting Officer*         *Commissioner of Patents and Trademarks*